(12) United States Patent
Nagelsdiek et al.

(10) Patent No.: US 10,519,358 B2
(45) Date of Patent: Dec. 31, 2019

(54) (METH)ACRYLIC COPOLYMERS AS RHEOLOGICAL ADDITIVES IN DRILLING FLUIDS AND DRILLING FLUIDS COMPRISING SUCH COPOLYMERS

(71) Applicant: BYK-CHEMIE GMBH, Wesel (DE)

(72) Inventors: René Nagelsdiek, Hamminkeln (DE); Alan Steinmetz, Louisville, KY (US); Justin Adams, Louisville, KY (US); Dominika Bernert, Wesel (DE); Jasmin Rudner, Oberhausen (DE); George Mark Zody, Louisville, KY (US)

(73) Assignee: BYK CHEMIE GMBH (DE)

( * ) Notice: Subject to any disclaimer, the term of this patent is extended or adjusted under 35 U.S.C. 154(b) by 0 days.

(21) Appl. No.: 16/475,255

(22) PCT Filed: Dec. 14, 2017

(86) PCT No.: PCT/EP2017/082852
§ 371 (c)(1),
(2) Date: Jul. 1, 2019

(87) PCT Pub. No.: WO2018/127375
PCT Pub. Date: Jul. 12, 2018

(65) Prior Publication Data
US 2019/0330510 A1    Oct. 31, 2019

(30) Foreign Application Priority Data
Jan. 3, 2017 (EP) ..................................... 17150185

(51) Int. Cl.
*C09K 8/36* (2006.01)
*E21B 21/00* (2006.01)

(52) U.S. Cl.
CPC ................ *C09K 8/36* (2013.01); *E21B 21/00* (2013.01)

(58) Field of Classification Search
CPC .................................. C09K 8/36; E21B 21/00
USPC .......................................................... 175/65
See application file for complete search history.

(56) References Cited

U.S. PATENT DOCUMENTS

| | | | |
|---|---|---|---|
| 3,506,574 A | 4/1970 | Stambaugh et al. | |
| 4,548,982 A | 10/1985 | Clark, Jr. et al. | |
| 4,656,226 A | 4/1987 | Hutchins et al. | |
| 4,755,563 A | 7/1988 | West | |
| 5,085,698 A | 2/1992 | Ma et al. | |
| 5,160,372 A | 11/1992 | Matrick | |
| 5,219,945 A | 6/1993 | Dicker et al. | |
| 5,221,334 A | 6/1993 | Ma et al. | |
| 5,272,201 A | 12/1993 | Ma et al. | |
| 5,519,085 A | 5/1996 | Ma et al. | |
| 5,629,270 A | 5/1997 | Van Slyke | |
| 5,859,113 A | 1/1999 | McIntyre et al. | |
| 6,306,994 B1 | 10/2001 | Donald et al. | |
| 6,316,564 B1 | 11/2001 | Huybrechts et al. | |
| 6,339,048 B1 | 1/2002 | Santhanam et al. | |
| 6,413,306 B1 | 7/2002 | Kraiter et al. | |
| 6,849,679 B2 | 2/2005 | Auschra et al. | |
| 6,861,393 B2 | 3/2005 | Temple et al. | |
| 7,285,515 B2 | 10/2007 | Goncalves et al. | |
| 7,345,010 B2 | 3/2008 | Thompson et al. | |
| 7,351,681 B2 | 4/2008 | Reddy et al. | |
| 7,449,430 B2 | 11/2008 | Guichard et al. | |
| 7,799,742 B2 | 9/2010 | Dino | |
| 2004/0143035 A1 | 7/2004 | Goebelt et al. | |
| 2013/0331303 A1 | 12/2013 | Rife et al. | |
| 2015/0376490 A1* | 12/2015 | Dino ........................ | C09K 8/34 507/117 |

FOREIGN PATENT DOCUMENTS

| | | |
|---|---|---|
| EP | 1416019 B1 | 5/2005 |
| WO | 0078891 A8 | 4/2001 |
| WO | 0144389 A1 | 6/2001 |
| WO | 03046029 A1 | 6/2003 |
| WO | 2005021676 A1 | 3/2005 |
| WO | 2012003325 A1 | 1/2012 |
| WO | 2014001192 A1 | 1/2014 |
| WO | 2014009408 A1 | 1/2014 |

OTHER PUBLICATIONS

International Search Report and Written Opinion for International Application No. PCT/EP2017/082852 dated Feb. 1, 2018 (8 pages).

* cited by examiner

*Primary Examiner* — William D Hutton, Jr.
*Assistant Examiner* — Ashish K Varma
(74) *Attorney, Agent, or Firm* — Fitch, Even, Tabin & Flannery LLP

(57) ABSTRACT

The invention relates to a drilling fluid in the form of a water-in-oil (W/O) emulsion comprising at least components (A) to (D), wherein component (D) is at least one (meth)acrylic copolymer, which contains at least one of structural units (D1), (D2) and (D3) to introduce at least one hydroxyl and/or amino functionality into the copolymer and which further contains at least one structural unit (D4), a use of said (meth)acrylic copolymer as rheological agent in drilling fluids, which are water-in-oil (W/O) emulsions, as well as to a method of producing oil and/or natural gas or of preparing the production thereof comprising the step of using the inventive drilling fluid for generating and/or operating a drill hole.

15 Claims, No Drawings

(METH)ACRYLIC COPOLYMERS AS RHEOLOGICAL ADDITIVES IN DRILLING FLUIDS AND DRILLING FLUIDS COMPRISING SUCH COPOLYMERS

The invention relates to a drilling fluid in the form of a water-in-oil (W/O) emulsion comprising at least components (A) to (D), wherein component (D) is at least one (meth)acrylic copolymer, which contains at least one of structural units (D1), (D2) and (D3) to introduce at least one hydroxyl and/or amino functionality into the copolymer and which further contains at least one structural unit (D4), a use of said (meth)acrylic copolymer as rheological agent in drilling fluids, which are water-in-oil (W/O) emulsions, as well as to a method of producing oil and/or natural gas or of preparing the production thereof comprising the step of using the inventive drilling fluid for generating and/or operating a drill hole.

BACKGROUND OF THE INVENTION

U.S. Pat. Nos. 7,799,742, 7,345,010 and 6,339,048 as well as US patent applications US 2015/0376490 A1 and US 2013/0331303 A1 disclose polyamide additives for rheological control in oil-based drilling fluids, which are reaction products of di- or polyamines and di- or polycarboxylic acids. However, in particular in drilling fluids with highly non-polar continuous phases—such as drilling fluids containing synthetic olefin hydrocarbons (e.g. the commercial product Amodrill® 1000)—the use of such polyamides as rheological additives can lead to an only poor solvation or precipitation of the rheological additive due to the polarity of the amide bonds of the additive. This is in particular a disadvantage, because there is a trend towards the use of such highly non-polar drilling fluids because of ecological reasons (e.g., the use of more polar fluids containing aromatic hydrocarbons is no longer envisaged). Further, the tuning of the polarity of such polyamide additives is difficult due to the pricing and the limited availability of fatty acids used for the preparation of such polyamide additives.

U.S. Pat. No. 7,449,430 relates to water-based drilling fluids and discloses the use of non-functional styrene-acrylate or styrene-butadiene based copolymers as fluid loss reducers. U.S. Pat. No. 7,351,681 is directed at a well bore servicing fluid such as a drilling fluid comprising an ionic water-soluble, hydrophobically modified polymer.

U.S. Pat. No. 6,861,393 discloses non-functional polyalkyl methacrylate polymers as additives for reducing sag in oil-based drilling fluids. Non-functional, styrene-based (co)polymers for use as rheological agents in oil-based drilling fluids are disclosed in WO 2014/009408 A1. U.S. Pat. No. 5,629,270 discloses an oil-based drilling fluid, which inter alia contains a non-sulfonated polystyrene. U.S. Pat. No. 7,285,515 is directed at oil-based drilling fluids, which inter alia contain fluid loss polyacrylate additives. U.S. Pat. No. 3,506,574 discloses an oil-based drilling fluid, which contains a graft copolymer of at least one (meth)acrylate, wherein N-vinyl pyrrolidone is grafted on the backbone of said copolymer.

The use of (meth)acrylic copolymers, which may but do not necessarily have to contain carboxylic acid functionalities, in oil-based drilling fluids is disclosed in WO 00/78891 A1. The copolymers according to WO 00/78891 A1 are not used as rheological agents, but are used as fluid loss additives. U.S. Pat. No. 4,548,982 discloses water loss additives for drilling fluids, which are ammonia salts of copolymers of (meth)acrylic acid and at least one of (meth)acrylic acid esters and vinyl esters of saturated monocarboxylic acids having 1 to 3 carbon atoms.

Problem

The known polymeric additives for incorporation into oil-based drilling fluids, however, are not able, to provide sufficient rheological properties of the drilling fluids. This is in particular the case, since the desire for offshore drilling is still increasing, which results in a need for a rheological additive that can provide a flat rheological profile as the drilling fluid experiences extreme and abrupt changes in temperature as it passes from the ocean and through the earth.

It was therefore an object of the present invention to provide rheological additives, which solve the before-mentioned drawbacks of the prior art additives and satisfy the above identified needs. It was in particular an object of the present invention to provide rheological additives that can be used in oil-based drilling fluids and which provide improved rheological properties.

Solution

This object has been solved by the subject-matter of the claims of the present application as well as by the preferred embodiments thereof disclosed in this specification, i.e. by the subject matter described herein.

A first subject-matter of the present invention is thus a drilling fluid in the form of a water-in-oil (W/O) emulsion comprising at least components (A) to (D), each being different from one another, namely
(A) at least one hydrocarbon as continuous phase,
(B) water or an aqueous solution of at least one organic and/or inorganic salt as discontinuous phase,
(C) at least one weighting agent, and
(D) at least one (meth)acrylic copolymer,
   wherein the (meth)acrylic copolymer (D) contains at least one of structural units (D1), (D2) and (D3), which are different from one another,
   structural unit (D1) comprising at least one hydroxyl group and not comprising any amino groups,
   structural unit (D2) comprising at least one amino group and not comprising any hydroxyl groups, and
   structural unit (D3) comprising both at least one hydroxyl group and at least one amino group,
   and wherein the (meth)acrylic copolymer further contains at least one structural unit (D4), which is different from any of structural units (D1), (D2) and (D3),
   structural unit (D4) containing the part structure (P)

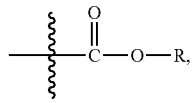

(P)

wherein
the symbol

denotes a covalent bond of part structure (P) to the backbone of the (meth)acrylic copolymer, and R denotes a $C_4$-$C_{25}$ aliphatic residue, an aromatic $C_6$-$C_{25}$ residue or an araliphatic $C_7$-$C_{25}$ residue.

In a preferred embodiment of the first subject-matter of the present invention, the inventive drilling fluid further comprises at least one oligomer, in particular at least one dimer and/or trimer, of at least one $C_{10}$-$C_{28}$ fatty acid as an additional component (E).

A further subject-matter of the present invention is a use of at least one (meth)acrylic copolymer as rheological additive in a drilling fluid, wherein the drilling fluid is a water-in-oil (W/O) emulsion and wherein the (meth)acrylic copolymer contains at least one of structural units (D1), (D2) and (D3), which are different from one another, structural unit (D1) comprising at least one hydroxyl group and not comprising any amino groups, structural unit (D2) comprising at least one amino group and not comprising ny hydroxyl groups, and structural unit (D3) comprising both at least one hydroxyl group and at least one amino group, and wherein the (meth)acrylic copolymer further contains at least one structural unit (D4), which is different from any of structural units (D1), (D2) and (D3), structural unit (D4) containing the part structure (P)

 (P)

wherein
the symbol

denotes a covalent bond of part structure (P) to the backbone of the (meth)acrylic copolymer, and R denotes a $C_4$-$C_{25}$ aliphatic residue, an aromatic $C_6$-$C_{25}$ residue or an araliphatic $C_7$-$C_{25}$ residue.

Preferably, the (meth)acrylic copolymer is used in combination with at least one organic acid, in particular with at least one $C_{10}$-$C_{28}$ fatty acid and/or with a oligomer, such as a dimer and/or trimer, thereof, as rheological agent.

A further subject-matter of the present invention is a method of producing oil and/or natural gas or of preparing the production of oil and/or natural gas, comprising the step of using an inventive drilling fluid for generating and/or operating a drill hole.

It has been surprisingly found that the inventively used copolymer is able to function as rheological agent in drilling fluids such as in the inventive drilling fluids. In particular, it has been surprisingly found that by incorporation of the inventively used copolymer in such drilling fluids, a flat rheology profile of the drilling fluid can be achieved, i.e. it has been observed that the inventively used copolymers impart a constant rheology over a broad range of temperatures, specifically in the range of 40° F. and 150° F. (i.e. in the range of 4.4° C. to 65.5° C.).

In particular, it has been surprisingly found that a constant viscosity profile over the whole application range such as in the range of 40° F. and 150° F. (i.e. in the range of 4.4° C. to 65.5° C.) during a drilling operation can be achieved by making use of the inventive drilling fluids due to the presence of the inventively used (meth)acrylic copolymer contained therein. This is in particular the case when an inventively used (meth)acrylic copolymer is used in combination with at least one oligomer, in particular at least one dimer and/or trimer of at least one $C_{10}$-$C_{28}$ fatty acid.

Moreover, it has been surprisingly found that—depending on the desired drilling fluid system and in particular the selection of the component of the continuous phase—the inventively used copolymer is able to provide a high flexibility and easy-to-handle properties due to its tunable architecture with respect to the use of structural units (D1) to (D4) and their amounts present in the copolymer.

DETAILED DESCRIPTION OF THE INVENTION

Herein the inventive drilling fluid is in some passages also referred to as "drilling mud". A person skilled in the art is aware that a drilling fluid in general contains a continuous phase and a discontinuous phase (dispersed phase).

The inventive drilling fluid is present in the form of a water-in-oil (W/O) emulsion, i.e. is a (W/O) emulsion (invert emulsion). A person skilled in the art is aware that this means that the inventive drilling fluid is an oil-based drilling fluid, i.e. a drilling fluid containing an "oil phase" as continuous phase.

Component (A) of the Drilling Fluid

The inventive drilling fluid contains at least one hydrocarbon as continuous phase (component (A)). The at least one hydrocarbon is preferably used as solvent/organic fluid component of the continuous phase.

Preferably, the least one hydrocarbon is a $C_{10}$ to $C_{100}$ hydrocarbon. Suitable hydrocarbons that can be used as component (A) are aliphatic hydrocarbons, aromatic hydrocarbons and/or araliphatic hydrocarbons. "Araliphatic" hydrocarbons in the sense of the present invention are hydrocarbons that contain both aliphatic and aromatic segments. Aliphatic hydrocarbons such as aliphatic $C_{10}$ to $C_{100}$ hydrocarbons as well as the aliphatic segments of araliphatic $C_{10}$ to $C_{100}$ hydrocarbons can be saturated or at least mono-unsaturated. The term "aliphatic" includes both cyclic and non-cyclic residues. Particularly preferred are aliphatic hydrocarbons. Preferably, component (A) is essentially free of aromatic hydrocarbons.

Examples of hydrocarbons that can be used as component (A) are diesel oils, mineral oils, kerosene, fuel oils, white oils, synthetic oils, crude oils, synthetic paraffins and olefins. Non-limiting examples of suitable hydrocarbons are Estegreen (Chevron), Ecoflow (Chevron), Saraline (Shell MDS), Mosspar H (PetroSA), Sarapar (Shell MDS), Baroid Alkane (Halliburton), XP-07 (Halliburton), Inteq (Baker Hughes Drilling Fluids), Novadrill (M-I Swaco), Biobase (Shrieve Chemicals), Sasol C1316 paraffin (Sasol), Isoteq (Baker Hughes Drilling Fluids), Amodrill (BP Chemicals), Petrofree Ester (Halliburton), Finagreen Ester (Fina Oil and Chemical), CPChem internal olefins (ChevronPhillips Chemical), and Neoflo olefins (Shell Chemicals). Further non-limiting examples include Escaid (Exxon), Vassa LP (Vassa), EDC-95-11 (Total), EDC99-DW (Total), HDF-2000 (Total), Mentor (Exxon), LVT (ConocoPhillips), HDF (Total), BP 83HF (BP), DMF 120HF (Fina), DF-1 (Total), EMO 4000, Shellsol DMA (Shell), IPAR 35 LV (Petro-Canada), IPAR 35 (PetroCanada), Telura 401 (Exxon), SIP-DRILL (SIP Ltd.), Puredrill® IA35LV, white oil (Ametek;

Paoli, Pa.), and Clairsol (Carless Solvents). Additional examples include, but are not limited to, crude oil, diesel oil, Ametek® (Ametek; Paoli, Pa.), Isomerized Alpha Olefin C16 (Chevron Phillips Chemical Company), Isomerized Alpha Olefin C18 (Chevron Phillips Chemical Company), Isomerized Alpha Olefin C16-18 (65:35) (Chevron Phillips Chemical Company), and kerosene.

Also, aromatic hydrocarbons can be used, like toluene, xylenes and/or trimethylbenzenes. An exemplary commercial product that is based on aromatic hydrocarbons is Shellsol® A by the company Overlack AG, Germany. However, for ecological reasons, the use of aromatic hydrocarbons is not preferred due to their (eco)toxic profile.

In certain embodiments, such as embodiments in which the drilling fluid may be subjected to high temperatures, component (A) is, preferably selected from environmentally benign hydrocarbons, meaning that component (A) is one which, over a reasonable course of time, will biodegrade into relatively harmless materials. Oils of this type are known for use in drilling fluids and similar applications, and are commonly hydrotreated light distillate. The resultant product contains minimal, if any, quantities of aromatic components, and mostly short chain hydrocarbons. The LVT® oil of Calumet Penrico, LLC, and the Low Toxicity Drilling Mud Oil of ExxonMobil, such as those based on ESCAID™ fluids, are commercial examples of such products. Synthesized biodegradable oils based on alpha or internal olefins or the like are also acceptable for use as component (A), such as AMODRILL® olefin fluids by INEOS USA, LLC, as well as ODC® high purity hydrocarbons of Sasol North America, Inc.

Exemplary commercial products that can be used as suitable hydrocarbons for providing the continuous phase are, e.g., the commercial products Amodrill® 1000 (from Ineos), LVT 200 (from DeltaDrilling), and Halliburton XP-07. The use of Amodrill® 1000 is particularly preferred. Amodrill® 1000 is a mixture of $C_{16}/C_{18}$ olefins. The use of olefins as component (A) is in particular preferred.

The continuous phase may additionally contain at least one further component, preferably a component that is miscible with the at least one hydrocarbon used as component (A). Such at least one further component is preferably an organic solvent such as an organic solvent selected from the group consisting of aliphatic alcohols, aromatic alcohols, araliphatic alcohols, esters, ethers, glycols, glycol ethers, dialkylcarbonates and/or alkylene carbonates.

Preferably, the inventive drilling fluid comprises the at least one hydrocarbon as continuous phase as component (A) in an amount of from 10 to 60 wt.-%, more preferably of from 12.5 to 55 wt.-%, even more preferably of from 15 to 50 wt.-%, still more preferably of from 17.5 to 45 wt.-%, in particular of from 20 to 40 wt.-%, in each case based on the total weight of the drilling fluid. The total amount of all components present in the drilling fluid adds up to 100 wt.-%.

Preferably, the amount of component (A) in the inventive drilling fluid is higher than the amount of component (B), more preferably is at least times 1.5, even more preferably is at least twice, the amount of component (B) in the drilling fluid, in each case with respect to wt.-%.

Component (B) of the Drilling Fluid

The inventive drilling fluid contains water or an aqueous solution of at least one organic and/or inorganic salt as discontinuous phase (component (B)). An example of an aqueous solution of at least one organic and/or inorganic salt known to a person skilled in the art is a brine. Depending on the type of salt dissolved, different types of brine are existent. Examples of suitable components (B) are formation brines and seawater. The organic and/or inorganic salt, which can be present in component (B) is preferably used to control the osmotic pressure of the drilling fluid as needed, e.g. according to drilling conditions.

The inventive drilling fluid containing water or an aqueous solution of at least one organic and/or inorganic salt as discontinuous phase as component (B) may further contain suitable hygroscopic materials such as glycols, glycerols and mixtures thereof. Thus, both mixtures of water and at least one of such hygroscopic materials and mixtures of an aqueous solution of at least one organic and/or inorganic salt and at least one of such hygroscopic materials can be used as component (B).

Preferably, an aqueous solution of at least one organic and/or inorganic salt, more preferably of at least one inorganic salt, is used as discontinuous phase.

Organic and/or inorganic salts that can be used are organic and/or inorganic salts that are selected from the group consisting of halides, carbonates, sulphates, phosphates, formates, acetates, citrates, lactates, malates, tartrates, hydroxides and mixtures thereof of at least one alkaline metal, at least one alkaline earth metal, at least one metal of the third main group and/or or at least one transition group metal of the periodic system of the elements.

Particularly preferred organic and/or inorganic salts are those of the alkaline metals and alkaline earth metals as well as those of the third main group metals and zinc. Especially preferred organic and/or inorganic salts are those of the main groups 1 and 2, mostly preferred are respective salts of Li, Na, K, Cs, Mg and Ca. Preferred anions in each case are halides, carbonates, sulphates, phosphates, formates and/or hydroxides. Especially preferred anions in each case are chlorides, bromides, and iodides. Most preferred salts are NaCl, KCl, NaBr, and/or $CaCl_2$.

The inventively used aqueous solution of at least one organic and/or inorganic salt preferably contains the at least one organic and/or inorganic salt in an amount of 0.1 to 40 wt.-%, more preferably of 5 to 35 wt.-%, even more preferably of 10 to 30 wt.-%, in particular of 15 to 25 wt.-%, in each based on the total weight of the solution.

The inventively used aqueous solution of at least one organic and/or inorganic salt may additionally contain at least one further water-miscible organic compound, which is different from the organic salt that may be contained in the inventively used aqueous solution.

Preferably, the inventive drilling fluid comprises component (B) in an amount of from 2.5 to 40 wt.-%, more preferably of from 5 to 35 wt.-%, even more preferably of from 5 to 30 wt.-%, still more preferably of from 10 to 25 wt.-%, in particular of from 10 to 20 wt.-%, in each case based on the total weight of the drilling fluid. The total amount of all components present in the drilling fluid adds up to 100 wt.-%.

Component (C) of the Drilling Fluid

The inventive drilling fluid contains at least one weighting agent as component (C). The weighting agent is used in order to enhance the density of the inventive drilling fluid and to serve as a filler.

Weighting materials agents that can be used as component (C) include such materials as calcium carbonate, silicates, clays, barites, specular hematite, iron ores, siderite, ilmenite, galena, and mixtures thereof. Weighting agents can be used to balance or adjust drilling fluid density and/or hydrostatic pressure, such as downhole pressure, to prevent fluids from entering the wellbore from the geological formation.

Preferably, the inventive drilling mud contains at least one weighting agent selected from the group consisting of galena, hematite, magnetite, iron oxides, illmenite, barite ($BaSO_4$), siderite, celestite, dolomite, calcite and combinations thereof. Barite is in particular preferred.

Preferably, the inventive drilling fluid comprises component (C) in an amount of from 10 to 90 wt.-%, more preferably of from 15 to 85 wt.-%, even more preferably of from 20 to 80 wt.-%, still more preferably of from 30 to 70 wt.-%, in particular of from 40 to 60 wt.-%, in each case based on the total weight of the drilling fluid. The total amount of all components present in the drilling fluid adds up to 100 wt.-%.

Component (D) of the Drilling Fluid

Herein the (meth)acrylic copolymer as component of the drilling fluid is also named an "inventively used copolymer" or simply "component (D)". The term "(meth)acrylic" means "acrylic" and/or "methacrylic". Similarly, "(meth) acrylate" means acrylate and/or methacrylate. Therefore, a "(meth)acrylic copolymer" in general may be formed from only "acrylic monomers", only "methacrylic monomers" or from both "acrylic and methacrylic monomers". However, ethylenically unsaturated monomers other than acrylic and/or methacrylic monomers as e.g. styrene and the like may also be additionally contained in a "(meth)acrylic copolymer". In other words, a (meth)acrylic copolymer may consist of only acrylic and/or methacrylic monomer units but does not have to. Preferably, the backbone of the (meth)acrylic copolymer is formed from more than 50 mole-%, even more preferably of from more than 75 mole-% of (meth)acrylic monomers.

Preferably, the inventively used (meth)acrylic copolymer has a weight average molecular weight ($M_w$) in the range of from 1,000 to 200,000 g/mol, more preferably of from 2,000 to 190,000 g/mol, even more preferably of from 5,000 to 180,000 g/mol, still more preferably of from 10,000 to 170,000 g/mol, yet more preferably of from 15,000 to 160,000 g/mol, in particular of from 20,000 to 150,000 g/mol.

In one preferred embodiment, the inventively used (meth) acrylic copolymer has a weight average molecular weight ($M_w$) in the range of from 10,000 to 100,000 g/mol, more preferably of from 20,000 to 80,000 g/mol, even more preferably of from 30,000 to 70,000 g/mol, still more preferably of from 40,000 to 60,000 g/mol. In another preferred embodiment, the inventively used (meth)acrylic copolymer has a weight average molecular weight ($M_w$) in the range of from 25,000 to 150,000 g/mol, more preferably of from 35,000 to 130,000 g/mol, even more preferably of from 45,000 to 110,000 g/mol, still more preferably of from 60,000 to 100,000 g/mol. In another preferred embodiment, the inventively used (meth)acrylic copolymer has a weight average molecular weight ($M_w$) in the range of from 50,000 to 200,000 g/mol, more preferably of from 60,000 to 180,000 g/mol, even more preferably of from 70,000 to 160,000 g/mol, still more preferably of from 80,000 to 155,000 g/mol, in particular of from 100,000 to 150,000 g/mol.

The weight average molecular weight of the inventively used copolymers is determined according to the method described hereinafter ("Test methods"), i.e. is determined via GPC using polystyrene standards and THF as eluent.

The inventively used copolymers preferably have a polydispersity P ($M_w/M_n$) of >1.0, more preferably of >1.2, even more preferably of >1.3, still more preferably of >1.4, yet more preferably of >2.0, in particular of >2.3 and most preferred of >2.5. The upper limit is in each case preferably a polydispersity P of 15.0, more preferably a polydispersity P of 10.0. $M_n$ is the number average molecular weight of the inventively used copolymers and can be determined according to the same method, which is also used for determining their weight average molecular weight. Preferably, the inventively used copolymers have a polydispersity P in the range of from >1.0 to 15.0 such as of from 1.02 to 15.0, more preferably of from 1.2 to 10.0, even more preferably of from 1.3 to 9.0, still more preferably of from 1.5 to 8.8, yet more preferably of from 1.7 to 8.6, even more preferably of from 2.0 to 9.4, in particular of from 2.4 to 9.0 and most preferred of from 2.8 to 8.5.

Preferably, the inventively used copolymer is a non-ionic copolymer, e.g. does not contain any ionic groups such as ammonium salt groups as, e.g., the polymers disclosed in U.S. Pat. No. 4,548,982.

Preferably, the inventively used (meth)acrylic copolymer does not contain any acid groups, in particular does not contain any carboxylic acid groups, neither in the free form nor in the form of a salt. Thus, preferably, none of the structural units (D1), (D2) and (D3) and (D4) contains such an acid group.

The inventively used (meth)acrylic copolymer (D) contains at least one of structural units (D1), (D2) and (D3), which are different from one another, structural unit (D1) comprising at least one hydroxyl group and not comprising any amino groups, structural unit (D2) comprising at least one amino group and not comprising any hydroxyl groups, and structural unit (D3) comprising both at least one hydroxyl group and at least one amino group, and further contains at least one structural unit (D4), which is different from any of structural units (D1), (D2) and (D3), which are different from one another, structural unit (D4) containing the part structure (P)

wherein
the symbol

denotes a covalent bond of part structure (P) to the backbone of the (meth)acrylic copolymer, and R denotes a $C_4$-$C_{25}$ aliphatic residue, preferably a $C_4$-$C_{22}$ aliphatic residue, more preferably a $C_8$-$C_{18}$ aliphatic residue, an aromatic $C_6$-$C_{25}$ residue or an aralipathic $C_7$-$C_{25}$ residue.

Preferably, the inventively used (meth)acrylic copolymer contains at least one of structural units (D1) and (D2).

In case the inventively used (meth)acrylic copolymer contains at least one of structural units (D1) and (D3), the copolymer preferably has an OH number in the range of from 5 to 150 mg KOH/g, more preferably of from 10 to 100 mg KOH/g, in particular of from >10 to 70 mg KOH/g.

In case the inventively used (meth)acrylic copolymer contains at least one of structural units (D2) and (D3), the copolymer preferably has an amine number in the range of from 5 to 200 mg KOH/g, more preferably of from 10 to 150 mg KOH/g, in particular of from >10 to 125 mg KOH/g.

The OH numbers are theoretical values determined by calculation based on the copolymer as such and on the molar ratios of the respective monomers used for its preparation. The same applies to the amine numbers.

The at least one amino group present in structural units (D2) and/or (D3) can be a primary, secondary or tertiary amino group. It is possible that one of structural units (D2) and (D3) contains, e.g., different types of amino groups such as one secondary and one tertiary amino group. It is, of course, also possible that each of structural units (D2) and (D3) contains the same type of amino groups such as tertiary amino groups only. Preferably, the at least one amino group present in structural units (D2) and/or (D3) is a tertiary amino group.

Preferably, the relative molar ratio of the at least one of structural units (D1), (D2) and (D3) to the at least one structural unit (D4) in the (meth)acrylic copolymer is in the range of from 1:40 to 1.5:1, more preferably in the range of from 1:35 to 1.5:1, even more preferably in the range of from 1:30 to 1:1, still more preferably in the range of from 1:27.5 to 1:1.5.

Preferably, the amount of structural units (D4) in the (meth)acrylic copolymer is at least 40 mole-% more preferably at least 45 mole-%, even more preferably at least 50 mole-% or at least 55 mole-%, still more preferably at least 60 mole-% or at least 65 mole-%, yet more preferably at least 70 mole-%, in particular at least 80 mole-%, most preferably at least 85 mole-%, in each case based on the total amount of all structural units of the copolymer.

Preferably, the amount of at least one of structural units (D1), (D2) and (D3) in the (meth)acrylic copolymer is at least 1 mole-%, more preferably at least 3 mole-%, even more preferably at least 5 mole-%, in particular at least 7 mole-% and most preferably at least 8 mole-%, in each case based on the total amount of structural units of the copolymer. Preferably, the amount of at least one of structural units (D1), (D2) and (D3) in the (meth)acrylic copolymer is at most 60 mole-%, more preferably at most 50 mole-%, even more preferably at most 40 mole-% or at most 30 mole-%, still more preferably at most 25 mole-% in particular at most 20 mole-% and most preferably at most 15 mole-%, in each case based on the total amount of all structural units of the copolymer.

Preferably, the amount of monomers used for incorporation of structural unit (D4) into the (meth)acrylic copolymer is at least 40 mole-% more preferably at least mole-%, even more preferably at least 50 mole-% or at least 55 mole-%, still more preferably at least 60 mole-% or at least 65 mole-%, yet more preferably at least 70 mole-%, in particular at least 80 mole-%, wherein the sum of all monomers used for preparing the (meth)acrylic copolymer adds up to 100 mole-%. Suitable monomers for incorporation of structural unit (D4) into the (meth)acrylic copolymer are, e.g., the monomers (d4) as specified hereinafter.

Radical R denotes a $C_4$-$C_{25}$ aliphatic residue, an aromatic $C_6$-$C_{25}$ residue or an araliphatic $C_7$-$C_{25}$ residue.

The term "$C_4$-$C_{25}$ aliphatic residue" refers in the sense of the present invention to an aliphatic residue having a total of 4 to 25 carbon atoms. A preferred "$C_4$-$C_{25}$ aliphatic residue" is a "$C_8$-$C_{25}$ aliphatic residue" having a total of 8 to 25 carbon atoms. Another preferred "$C_4$-$C_{25}$ aliphatic residue" is a "$C_4$-$C_{12}$ aliphatic residue" having a total of 4 to 22 carbon atoms. More preferred is a "$C_8$-$C_{18}$ aliphatic residue" having a total of 8 to 18 carbon atoms. Even more preferred is a "$C_8$-$C_{14}$ aliphatic residue" having a total of 8 to 14 carbon atoms. The respective aliphatic residue can be unsaturated or saturated, but preferably is saturated. Further, the respective aliphatic residue can be branched or unbranched (linear). In addition, the term "aliphatic" includes in each case both cyclic and non-cyclic residues, but preferably only means non-cyclic residues.

The term "$C_6$-$C_{25}$ aromatic residue" refers in the sense of the present invention to an aromatic residue having a total of 6 to 25 carbon atoms. A preferred "$C_6$-$C_{25}$ aromatic residue" is a "$C_6$-$C_{20}$ aromatic residue" having a total of 6 to 20 carbon atoms. More preferred is a "$C_6$-$C_{14}$ aromatic residue" having a total of 6 to 14 carbon atoms.

The term "$C_7$-$C_{25}$ araliphatic residue" refers in the sense of the present invention to an araliphatic residue having a total of 7 to 25 carbon atoms. A preferred "$C_7$-$C_{25}$ a araliphatic residue" is a "$C_7$-20 araliphatic residue" having a total of 7 to 20 carbon atoms. More preferred is a "$C_7$-$C_{14}$ araliphatic residue" having a total of 7 to 14 carbon atoms. Araliphatic residues in the sense of the present invention contain both aliphatic and aromatic segments. The term "aliphatic" again includes both cyclic and non-cyclic residues, preferably only non-cyclic residues.

Preferably, radical R denotes a $C_4$-$C_{25}$ aliphatic residue, more preferably a $C_8$-$C_{25}$ aliphatic residue or a $C_4$-$C_{22}$ aliphatic residue, or an araliphatic $C_7$-$C_{25}$ residue, more preferably a $C_6$-$C_{20}$ araliphatic residue. Most preferably, radical R denotes a $C_8$-$C_{25}$ aliphatic residue or a $C_4$-$C_{22}$ aliphatic residue or a $C_8$-$C_{18}$ aliphatic residue or a $C_8$-$C_{22}$ aliphatic residue or a $C_8$-$C_{14}$ aliphatic residue or a $C_4$-$C_{14}$ aliphatic residue.

The polymerization reaction for preparing the inventively used copolymer can be carried out by all methods known in literature, such as free radical polymerization, controlled/living radical polymerization, ionic polymerization, or group transfer polymerization. It is well-known that the average molecular weight and its distribution of an inventively used copolymer can be controlled by using chain transfer agents or making use of controlled/living polymerization technologies. Branched or star shaped structures are available for example by using difunctional or higher functional co-monomers during the copolymerization and/or the use of multifunctional initiators and/or multifunctional chain transfer agents. Free radical polymerization is preferred. At least two ethylenically unsaturated monomers different from one another are preferably used, which each contain at least one, preferably precisely one, terminal ethylenically unsaturated group.

Preferably, the inventively used copolymer is a random copolymer or structured copolymer. Structured copolymers are e.g. block copolymers such as linear block copolymers, branched block copolymers, star-shaped block copolymers, gradient copolymers and comb copolymers. Thus, the inventively used copolymer may have a random, or gradient-like or block-like sequence of copolymerized structural units derived from suitable ethylenically unsaturated monomers.

In one preferred embodiment the inventively used copolymer has a random sequence of copolymerized structural units. The structure of the inventively used copolymer is preferably linear or branched.

In another preferred embodiment the inventively used copolymer has a gradient-like or block-like sequence of copolymerized structural units.

Gradient copolymers are preferably copolymers, in which, along the polymer chains, the concentration of structural units of a particular ethylenically unsaturated monomer or the structural units of a mixture of ethylenically unsaturated monomers decreases continuously and the concentration of structural units of a different ethylenically saturated monomer or of structural units of a mixture of different ethylenically unsaturated monomers increases. The term "gradient copolymer" is known to those skilled in the art. Thus for example gradient copolymers are disclosed in EP 1 416 019 A1 and in WO 01/44389 A1.

Block copolymers are copolymers obtained by adding at least two different ethylenically unsaturated monomers, two different mixtures of ethylenically unsaturated monomers or by adding an ethylenically unsaturated monomer and a mixture of ethylenically unsaturated monomers at different times in the practice of a controlled polymerization, wherein an ethylenically unsaturated monomer or a mixture of ethylenically unsaturated monomers is initially charged at the start of the reaction. At the time of adding the further ethylenically unsaturated monomer or the mixture of ethylenically unsaturated monomers or adding ethylenically unsaturated monomers in multiple installments, the ethylenically unsaturated monomers added at the start of the polymerization can be already completely reacted, or still be partly unpolymerized. As a result of such a polymerization, block copolymers may have at least one transition in their structural units along the polymer chain, said transition marking the boundary between the individual blocks. Suitable block copolymer structures are e.g. AB diblock copolymers, ABA triblock copolymers or ABC triblock copolymers. Examples of producing such block copolymer structures are found in U.S. Pat. Nos. 6,849,679, 4,656,226, 4,755,563, 5,085,698, 5,160,372, 5,219,945, 5,221,334, 5,272,201, 5,519,085, 5,859,113, 6,306,994, 6,316,564, 6,413,306, WO 01/44389 and WO 03/046029. Block copolymers, which are preferably used according to the present invention, contain blocks having a minimum number of 3 structural units per block. The minimum number of structural units per block is preferably 3, more preferably 5 and most preferably 10. Each of the blocks may contain the same structural units, but each in different numbers, or is constructed of different structural units.

In case the inventively used copolymer has a block structure, it preferably is of the type A-B, A-B-A, B-A-B, A-B-C and/or A-C-B, in which the A, B and C blocks represent a differing composition of structural units, wherein the blocks A, B and C differ in their respective composition of structural units and/or wherein the amount of structural units in two adjacent blocks differs from each other by more than 5% by weight in each case.

Preferably, the (meth)acrylic copolymer as component (D) is obtainable by copolymerization of at least one of monomers (d1), (d2) and (d3), namely (d1) 3 to 60 mole-% of at least one ethylenically unsaturated monomer having at least one hydroxyl group or at least one functional group that can be transformed into a hydroxyl group by a polymer analogous reaction after formation of the copolymer, and/or (d2) 3 to 60 mole-% of at least one ethylenically unsaturated monomer having at least one amino group or at least one functional group that can be transformed into an amino group by a polymer analogous reaction after formation of the copolymer, and/or (d3) 3 to 60 mole-% of at least one ethylenically unsaturated monomer having at least one amino group or at least one functional group that can be transformed into an amino group by a polymer analogous reaction after formation of the copolymer and having at least one hydroxyl group or at least one functional group that can be transformed into a hydroxyl group by a polymer analogous reaction after formation of the copolymer, and at least one of monomers (d4), namely (d4) 40 to 97 mole-% of at least one monomer selected from the group consisting of (meth)acrylic esters of an aliphatic $C_4$-$C_{25}$-monoalcohol, (meth)acrylic esters of an aromatic $C_6$-$C_{25}$ monoalcohol, (meth)acrylic esters of an araliphatic $C_7$-$C_{25}$-monoalcohol and mixtures thereof, more preferably selected from the group consisting of (meth)acrylic esters of aliphatic $C_4$-$C_{22}$-monoalcohols, even more preferably selected from the group consisting of (meth)acrylic esters of aliphatic $C_8$-$C_{18}$-monoalcohols, as well as optionally at least one of monomers (d5), (d6) and (d7), namely (d5) 0 to 20 mole-% of at least one monomer selected from the group consisting of (meth)acrylic esters of an aliphatic $C_1$-$C_3$-monoalcohol, and/or (d6) 0 to 20 mole-% of at least one monomer having precisely one ethylenically unsaturated group such as styrene, which is different from each of monomers (d1), (d2), (d3), (d4) and (d5), and/or (d7) 0 to 5 mole-% of at least one monomer having at least two ethylenically unsaturated groups, which is different from each of monomers (d1), (d2), (d3), (d4) and (d5), and/or wherein the sum of monomers (d1), (d2), (d3), (d4), (d5), (d6) and (d7) used for the preparation of the copolymer adds up to 100 mole-%.

Preferably, monomers (d1), (d2), (d3), (d4) as well as (d5), (d6) and (d7) are different from each other.

Monomers (d1), which can be used for preparing structural unit (D1), are preferably defined as above, i.e. as ethylenically unsaturated monomers having at least one hydroxyl group or at least one functional group that can be transformed into a hydroxyl group by a polymer analogous reaction after formation of the copolymer. Preferably, however, monomer (d1) already contains at least one hydroxyl group.

Monomers (d2), which can be used for preparing structural unit (D2), are preferably defined as above, i.e. as ethylenically unsaturated monomers having at least one amino group or at least one functional group that can be transformed into an amino group by a polymer analogous reaction after formation of the copolymer. Preferably, however, monomer (d2) already contains at least one amino group.

Monomers (d3), which can be used for preparing structural unit (D3), are preferably defined as above, i.e. as ethylenically unsaturated monomers having at least one amino group or at least one functional group that can be transformed into an amino group by a polymer analogous reaction after formation of the copolymer and having at least one hydroxyl group or at least one functional group that can be transformed into a hydroxyl group by a polymer analogous reaction after formation of the copolymer. This definition covers the possibility that the at least one functional group, that can be transformed into a hydroxyl group by a polymer analogous reaction after formation of the copolymer, and the at least one functional group, that can be transformed into an amino group by a polymer analogous reaction after formation of the copolymer, are identical. In other words, one single functional group may be transformed into both a hydroxyl group and an amino group by a polymer analogous reaction after formation of the polymer. For example, an epoxide group containing ethylenically unsaturated monomer such as glycidyl (meth)acrylate may be used for preparing a precursor structural unit (D3) of the copolymer. By a polymer analogous reaction after formation of the copolymer, said epoxide group may then be transformed by reaction with a primary or secondary amine into a structural unit (D3) containing both a hydroxyl group and an amino group.

Monomers (d4) can be used for preparing structural unit (D4), monomers (d5) can be used for preparing optional structural unit (D5), monomers (d6) can be used for preparing optional structural unit (D6) and monomers (d7) can be used for preparing optional structural unit (D7).

Preferably, monomers (d1) are (meth)acrylate and/or (meth)acrylamide momomers, in particular (meth)acrylate monomers.

Examples of monomers (d1) are 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, 3-phenoxy-2-hydroxypropyl (meth)acrylate, glycerol mono (meth)acrylate, N-(2-hydroxypropyl) (meth)acrylamide, allyl alcohol, hydroxystyrene, hydroxyalkyl vinyl ethers such as hydroxybutyl vinyl ether and vinylbenzyl alcohol. Further examples of monomers (d1) are alkoxylated derivatives of these monomers. Further examples of monomers (d1) are derivatives thereof, which are obtainable by reaction with oxetanes. Other examples of monomers (d1) are such monomers, which can be obtained by ring-opening polymerization of lactones using the hydroxyl functional monomers named before as starter: in this case preferred lactones are gamma-butyrolactone, delta-valerolactone, and epsilon-caprolactone as well as combinations thereof. The hydroxyl functional monomers named before can also undergo a combination of alkoxylation, reaction with oxetanes, and/or lactone ring opening polymerization to yield a mixed polyether/polyester macromonomer with OH functionality, which can be used as monomer (d1). Among these examples 2-hydroxyethyl acrylate, 2-hydroxyethyl methacrylate, 3-hydroxypropyl acrylate and 3-hydroxypropyl methacrylate or mixtures thereof are particularly preferred.

Examples of monomers (d2) are N,N-dimethylaminoethyl acrylate, N,N-dimethylaminoethyl methacrylate, N,N-dimethylaminopropyl acrylate, N,N-dimethylaminopropyl methacrylate, 2-(N,N-diethylamino)ethyl (meth)acrylate, 2-(N,N-dimethylamino)ethyl (meth)acrylate, N-[3-(N,N-dimethylamino)propyl](meth)acrylamide, 3-dimethylaminoneopentyl (meth)acrylate, 2-N-morpholinoethyl (meth)acrylate, N-[3-(N,N-dimethylamino)propyl](meth)acrylamide, 2-(N,N-diethylamino)ethyl (meth)acrylamide, 2-(tert-butylamino)ethyl (meth)acrylate, 2-diisopropylaminoethyl (meth)acrylate, N-dodecylacrylamide and N-[2-(N,N-Dimethylamino)ethyl] (meth)acrylamide, 2-vinylpyridine, 4-vinylpyridine, allyl amine, and vinylimidazole as well as N,N-diethylaminostyrene (all isomers) and N,N-diethylamino-alpha-methylstyrene (all isomers). Among these examples, the (meth)acrylate and (meth)acrylamide based monomers (d2) are preferred. (Meth)acrylate monomers are very preferred. Particularly preferred monomers (d2) are N,N-dimethylaminoethyl acrylate, N,N-dimethylaminoethyl methacrylate, N,N-dimethylaminopropyl acrylate and N,N-dimethylaminopropyl methacrylate or mixtures thereof.

Examples of monomers (d4), which are (meth)acrylic esters of an aliphatic $C_4$-$C_{25}$-monoalcohol are n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate and isobornyl methacrylate.

An example of a monomer (d4), which is a (meth)acrylic ester of an aromatic $C_6$-$C_{25}$-monoalcohol is phenyl (meth)acrylate. Examples of monomers (d4), which are (meth)acrylic esters of an araliphatic $C_4$-$C_{25}$-monoalcohol are benzyl acrylate and benzyl methacrylate. Particularly preferred are (meth)acrylic esters of an aliphatic $C_8$-$C_{25}$-monoalcohol, most preferred of an aliphatic $C_8$-$C_{18}$-monoalcohol.

Preferred monomers are n-butyl acrylate, n-butyl methacrylate, lauryl acrylate, lauryl methacrylate, 2-ethylhexyl acrylate and 2-ethylhexyl methacrylate. Most preferred are lauryl acrylate, lauryl methacrylate, 2-ethylhexyl acrylate and 2-ethylhexyl methacrylate.

Examples of monomers (d5), which are (meth)acrylic esters of an aliphatic $C_1$-$C_3$-monoalcohol are methyl acrylate, methyl methacrylate, ethyl acrylate, ethyl methacrylate, n-propyl (meth)acrylate and isopropyl (meth)acrylate.

Examples of monomers (d6) are styrene, alpha-alkylstyrenes, especially alpha-methylstyrene, and/or vinyltoluene; vinylbenzoic acid (all isomers), alpha-methylvinylbenzoic acid (all isomers), and/or p-vinylbenzenesulfonic acid, maleic and/or fumaric acid and/or itaconic acid and their esters, amides, and imides, and (meth)acrylic acid, nitriles such as acrylonitrile and/or methacrylonitrile and methoxypolyethylene glycol monoacrylate and methoxypolyethylene glycol monomethacrylate as well as methoxypolypropylene glycol monoacrylate and methoxypolypropylene glycol monomethacrylate. Preferably, however, monomers containing acid groups are not used as monomers (d6). A particularly preferred monomer (d6) is styrene.

Examples of monomers (d7) are divinylbenzene, di(meth)acrylate monomers, tri(meth)acrylate monomers and tetra (meth)acrylate monomers.

More preferably, the (meth)acrylic copolymer as component (D) is obtainable by copolymerization of at least one of monomers (d1), (d2) and (d3), namely (d1) 5 to 50 mole-% of at least one monomer selected from the group consisting of (meth)acrylic esters of aliphatic $C_1$-$C_6$-monoalcohols, which bear at least one hydroxyl group or at least one functional group that can be transformed into a hydroxyl group by a polymer analogous reaction after formation of the copolymer, (meth)acrylic amides containing an aliphatic $C_1$-$C_6$-group, which bear at least one hydroxyl group or at least one functional group that can be transformed into a hydroxyl group by a polymer analogous reaction after formation of the copolymer, and mixtures thereof, and/or (d2) 5 to 50 mole-% of at least one monomer selected from the group consisting of (meth)acrylic esters of an aliphatic $C_1$-$C_6$-monoalcohols, which bear at least one amino group or at least one functional group that can be transformed into an amino group by a polymer analogous reaction after formation of the copolymer, (meth)acrylic amides containing an aliphatic $C_1$-$C_6$-group, which bear at least one amino group or at least one functional group that can be transformed into an amino group by a polymer analogous reaction after formation of the copolymer, and mixtures thereof, and/or (d3) 5 to 50 mole-% of at least one monomer selected from the group consisting of (meth)acrylic esters of aliphatic $C_1$-$C_6$-monoalcohols, which bear at least one amino group or at least one functional group that can be transformed into an amino group by a polymer analogous reaction after formation of the copolymer and at least one hydroxyl group or at least one functional group that can be transformed into a hydroxyl group by a polymer analogous reaction after formation of the copolymer, (meth)acrylic amides containing an aliphatic $C_1$-$C_6$-group, which bear at least one amino group or at least one functional group that can be transformed into an amino group by a polymer analogous reaction after formation of the copolymer and at least one hydroxyl group or at least one functional group that can be transformed into a hydroxyl group by a polymer analogous reaction after formation of the copolymer, and mixtures thereof, and at least one of monomers (d4), namely (d4) 50 to 95 mole-% of at least one monomer selected from the group consisting of (meth)acrylic esters of an aliphatic $C_4$-$C_{25}$-monoalcohol, (meth)acrylic esters of an araliphatic $C_7$-$C_{25}$-monoalcohol and mixtures thereof, more preferably selected from the group consisting of (meth)acrylic esters of aliphatic $C_4$-$C_{22}$-monoalcohols, even more preferably selected from the group consisting of (meth)acrylic esters of aliphatic $C_8$-$C_{18}$-monoalcohols, as well as optionally at least one of monomers (d5), (d6) and (d7), namely (d5) 0 to 15 mole-% of at least one monomer selected from the group consisting of (meth)acrylic esters of an aliphatic $C_1$-$C_3$-monoalcohol, and/or (d6) 0 to 15 mole-% of at least one monomer having precisely one ethylenically unsaturated group, which is different from each of monomers (d1), (d2), (d3), (d4) and (d5), and/or (d7) 0 to 4 mole-% of at least one monomer having at least two ethylenically unsaturated groups, which is different from each of monomers (d1), (d2), (d3), (d4) and (d5), and/or wherein the sum of monomers (d1), (d2), (d3), (d4), (d5), (d6) and (d7) used for the preparation of the copolymer adds up to 100 mole-%.

Even more preferably, the (meth)acrylic copolymer as component (D) is obtainable by copolymerization of at least one of monomers (d1) and (d2), namely (d1) 7 to 30 mole-% of at least one monomer selected from the group consisting of (meth)acrylic esters of aliphatic $C_1$-$C_6$-monoalcohols, which bear at least one hydroxyl group or at least one functional group that can be transformed into a hydroxyl group by a polymer analogous reaction after formation of the copolymer, and/or (d2) 7 to 30 mole-% of at least one monomer selected from the group consisting of (meth)acrylic esters of an aliphatic $C_1$-$C_6$-monoalcohols, which bear at least one tertiary amino group or at least one functional group that can be transformed into a tertiary amino group by a polymer analogous reaction after formation of the copolymer, and/or and at least one of monomers (d4), namely (d4) 70 to 93 mole-% of at least one monomer selected from the group consisting of (meth)acrylic esters of an aliphatic $C_4$-$C_{25}$-monoalcohol, more preferably selected from the group consisting of (meth)acrylic esters of aliphatic $C_4$-$C_{22}$-monoalcohols, even more preferably selected from the group consisting of (meth)acrylic esters of aliphatic $C_8$-$C_{18}$-monoalcohols, as well as optionally at least one of monomers (d5), (d6) and (d7), namely (d5) 0 to 10 mole-% of at least one monomer selected from the group consisting of (meth)acrylic esters of an aliphatic $C_1$-$C_3$-monoalcohol, and/or (d6) 0 to 10 mole-% of at least one monomer having precisely one ethylenically unsaturated group, which is different from each of monomers (d1), (d2), (d3), (d4) and (d5), and/or (d7) 0 to 3 mole-% of at least one monomer having at least two ethylenically unsaturated groups, which is different from each of monomers (d1), (d2), (d3), (d4) and (d5), and/or wherein the sum of monomers (d1), (d2), (d4), (d5), (d6) and (d7) used for the preparation of the copolymer adds up to 100 mole-%.

Still more preferably, the (meth)acrylic copolymer as component (D) is obtainable by copolymerization of at least one of monomers (d1) and (d2), namely (d1) 8 to 20 mole-% of at least one monomer selected from the group consisting of (meth)acrylic esters of aliphatic $C_1$-$C_6$-monoalcohols, which bear at least one hydroxyl group or at least one functional group that can be transformed into a hydroxyl group by a polymer analogous reaction after formation of the copolymer, and/or (d2) 8 to 20 mole-% of at least one monomer selected from the group consisting of (meth)acrylic esters of an aliphatic $C_1$-$C_6$-monoalcohols, which bear at least one tertiary amino group or at least one functional group that can be transformed into a tertiary amino group by a polymer analogous reaction after formation of the copolymer, and/or and at least one of monomers (d4), namely (d4) 80 to 92 mole-% of at least one monomer selected from the group consisting of (meth)acrylic esters of an aliphatic $C_4$-$C_{25}$-monoalcohol, more preferably selected from the group consisting of (meth)acrylic esters of aliphatic $C_4$-$C_{22}$-monoalcohols, even more preferably selected from the group consisting of (meth)acrylic esters of aliphatic $C_8$-$C_{18}$-monoalcohols, as well as optionally at least one of monomers (d5), (d6) and (d7), namely (d5) 0 to 10 mole-% of at least one monomer selected from the group consisting of (meth)acrylic esters of an aliphatic $C_1$-$C_3$-monoalcohol, and/or (d6) 0 to 10 mole-% of at least one monomer having precisely one ethylenically unsaturated group, which is different from each of monomers (d1), (d2), (d3), (d4) and (d5), and/or (d7) 0 to 2 mole-% of at least one monomer having at least two ethylenically unsaturated groups, which is different from each of monomers (d1), (d2), (d3), (d4) and (d5), and/or wherein the sum of monomers (d1), (d2), (d4), (d5), (d6) and (d7) used for the preparation of the copolymer adds up to 100 mole-%.

Preferably, the (meth)acrylic copolymer contains 3 to 60 mole-% of at least one of structural units (D1), (D2) and/or (D3), 40 to 97 mole-% of structural units (D4) as well as optionally 0 to 20 mole-% of at least one of structural units (D5) and (D6) as well as optionally 0 to 5 mole-% of structural units (D7), wherein the amounts in mole-% are based in each case on the total amount of all structural units of the copolymer. Structural units (D5) and (D6) can be formed from monomers (d5) and (d6), respectively. Structural unit (D7) can be formed from monomers (d7).

More preferably, the (meth)acrylic copolymer contains 5 to 50 mole-% of at least one of structural units (D1), (D2)

and/or (D3), 50 to 95 mole-% of structural units (D4) as well as optionally 0 to 15 mole-% of at least one of structural units (D5) and (D6) as well as optionally 0 to 4 mole-% of structural units (D7), wherein the amounts in mole-% are based in each case on the total amount of all structural units of the copolymer.

Even more preferably, the (meth)acrylic copolymer contains 7 to 30 mole-% of at least one of structural units (D1), (D2) and/or (D3), 70 to 93 mole-% of structural units (D4) as well as optionally 0 to 10 mole-% of at least one of structural units (D5) and (D6) as well as optionally 0 to 3 mole-% of structural units (D7), wherein the amounts in mole-% are based in each case on the total amount of all structural units of the copolymer.

Still more preferably, the (meth)acrylic copolymer contains 8 to 25 mole-% of at least one of structural units (D1), (D2) and/or (D3), 75 to 92 mole-% of structural units (D4) as well as optionally 0 to 10 mole-% of at least one of structural units (D5) and (D6) as well as optionally 0 to 2 mole-% of structural units (D7), wherein the amounts in mole-% are based in each case on the total amount of all structural units of the copolymer.

Typical reactions for transforming a functional group into a hydroxyl group by a polymer analogous reaction after formation of the copolymer or for transforming a functional group into an amino group by a polymer analogous reaction after formation of the copolymer are (i) the esterification or amidation of (meth)acrylic acid units or maleic anhydride based units or (ii) the transesterification or amidation of (meth)acrylate units with aminoalcohols like N,N-dialkylaminoalkyl alcohols or amines like N,N-dialkylaminoalkyl amines or (iii) the ring opening reaction of an epoxide group like in a glycidyl (meth)acrylate based structural unit, in which a hydroxyl group is formed. If this ring opening in case of (iii) is achieved using an amine, a combination of an amine and a hydroxyl function within the same repeating unit is obtained, so that e.g. a structural unit (D3) can be formed. Another typical reaction is the deprotection of protected monomers like vinylacetate (resulting in a vinyl alcohol based structural unit) or vinyl formamide (resulting in a vinyl amine based structural unit).

The inventively used copolymer functions as rheological agent in the inventive drilling fluids. In particular, it has been surprisingly found that by incorporation of the inventively used copolymer in the inventive drilling fluids, a flat rheology profile of the drilling fluid can be achieved. Parameters for achieving a flat rheology profile are known to the person skilled in the art and, e.g., named and disclosed in US 2013/0331303 A1. A "flat rheology profile" in the sense of the present invention preferably means that the inventively used copolymers impart a constant rheology over a broad range of temperatures, specifically in the range of 40° F. and 150° F. (i.e. in the range of 4.4° C. to 65.5° C.).

Preferably, the amount of the inventively used copolymer in the inventive drilling fluid is of from 0.005 to 8.0 wt.-% or of from 0.005 to 5.0 wt.-%, more preferably of from 0.075 to 4.0 wt.-%, even more preferably of from 0.01 to 3.0 wt.-%, still more preferably of from 0.015 to 2.5 wt.-%, yet more preferably of from 0.02 to 2.0 wt.-%, in particular of from 0.025 to 1.5 wt.-%, in each based on the total weight of the drilling fluid. The total amount of all components present in the drilling fluid adds up to 100 wt.-%.

Optional Component (E) of the Drilling Fluid

Preferably, the inventive drilling fluid further comprises at least one acid as component (E). Said at least one acid can be an inorganic and/or an organic acid. Preferably, component (E) is at least one organic acid. More preferably, component (E) is at least one organic $C_{10}$-$C_{28}$ fatty acid and/or at least one oligomer of at least one $C_{10}$-$C_{28}$ fatty acid. In particular, at least one dimer and/or trimer of at least one $C_{10}$-$C_{28}$ fatty acid, most preferably at least one dimer and/or trimer of at least one $C_{12}$-$C_{24}$ fatty acid is used as component (E). Thus, preferably, the inventively used (meth)acrylic copolymer is used in combination with at least one acid such as at least one oligomer of at least one $C_{10}$-$C_{28}$ fatty acid in the inventive drilling fluid.

The term "fatty acid" refers in the sense of the present invention to an aliphatic $C_{10}$-$C_{28}$ monocarboxylic acid having a total of 10 to 28, i.e., 10, 11, 12, 13, 14, 15, 16, 17, 18, 19, 20, 21, 22, 23, 24, 25, 26, 27 or 28 carbon atoms, preferably to an aliphatic $C_{12}$-$C_{24}$ monocarboxylic acid having a total of 12 to 24 carbon atoms, more preferably to an aliphatic $C_{14}$-$C_{20}$ monocarboxylic acid having a total of 14 to 20 carbon atoms, in particular to an aliphatic $C_{16}$-$C_{18}$ monocarboxylic acid having a total of 16 to 18 carbon atoms, each having in each case precisely one —C(=O)—OH group. The oligomer of the at least one fatty acid can be saturated or at least mono-unsaturated. The expression "aliphatic" here embraces preferably acyclic saturated or unsaturated, preferably unsaturated, branched or unbranched aliphatic radicals. Unsaturated aliphatic radicals here have at least one, preferably 1, 2, 3, 4, or 5, more preferably 1, 2, 3, or 4, very preferably 1, 2, or 3 carbon double bond(s). The fatty acids may be natural or synthetically produced fatty acids. Exemplary fatty acids that can be oligomerized are selected from the group consisting of myristic acid, pentadecanoic acid, palmitic acid, margaric acid, stearic acid, nonadecanoic acid, arachidic acid, henicosanoic acid, docosanoic acid, myristoleic acid, palmitoleic acid, petroselinic acid, oleic acid, elaidic acid, vaccenic acid, gadoleic acid, icosenoic acid, cetoleic acid, erucasic acid, linoleic acid such as α-linoleic acid, linolenic acid such as γ-linolenic acid, calendic acid such as α-calendic acid and β-calendic acid, punicic acid, eleostearic acid, arachidonic acid, timnodonic acid, clupanodonic acid, cervonic acid, hexadecatrienoic acid, rumelenic acid, stearidonic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, catalpic acid, punicic acid, 10E, 12Z-octadeca-9,11-dienoic acid, pinolenic acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, rumenic acid, paullinic acid, 15-docosenoic acid, 17-tetracosenoic acid, oleic acid, gondoic acid, mead acid, erucic acid, nervonic acid and sapienic acid. Mixtures of oleic acid and linoleic acid occur, for example, in tall oil fatty acids, which are thus a commercial source of these fatty acids. The term "fatty acid" encompasses, in the sense of the present invention, preferably also fatty acid derivatives such as corresponding fatty acid esters and/or salts of these fatty acids, for example.

Preferably, at least one dimer and/or trimer ("dimerized and/or trimerized fatty acids") of at least one $C_{10}$-$C_{28}$ fatty acid is used as component (E). A dimer can be formed from two identical or from two different fatty acids. Similarly, a trimer can be formed from identical or different fatty acids. At least one $C_{10}$-$C_{28}$ fatty acid has to be used for preparing component (E). Preferably, only $C_{10}$-$C_{28}$ fatty acids as acid components are used for preparing component (E). However, it is, e.g., also possible to use only one $C_{10}$-$C_{28}$ fatty acid and one other acid: for example, at least one aliphatic $C_{10}$-$C_{28}$ monocarboxylic acid can be dimerized with (meth) acrylic acid. One preferred example for this is 5-(or 6)-carboxy-4-hexylcyclohex-2-ene-1-octanoic acid, a monocyclic $C_{21}$ dicarboxylic acid.

Oligomers of fatty acids ("oligomerized fatty acids") including dimers and trimers thereof are known to a person skilled in the art. Preferred are dimers and/or trimers of any the above named exemplary fatty acids, wherein the dimers and trimer can be composed of identical or different fatty acids in each case. Most preferred are dimers and/or trimers of fatty acids selected from the group consisting of linoleic acid, oleic acid, palmitic acid, tall oil fatty acids combinations thereof. A number of oligomers of fatty acids are commercially available. Exemplary commercial products are products of the Empol® series from the company BASF and of the Pripol® series from the company Croda such as Empol® 1003, 1005, 1008, 1012, 1016, 1026, 1028, 1043, 1061 and 1062 and Pripol® 1006, 1009, 1012, 1013, 1017, 1022, 1025, 1027 and 1040.

Preferably, the relative weight ratio of the inventively used (meth)acrylic copolymer and the at least one oligomer of at least one $C_{10}$-$C_{28}$-fatty acid is in the range of from 1:99 to 99:1, more preferably of from 1:9 to 9:1, even more preferably of from 1:7.5 to 1.5:1, still more preferably of from 1:5.5 to 1:1.5, in particular of from 1:4 to 1:2.3.

Preferably, the inventive drilling fluid comprises component (E) in an amount of from 0.005 to 10 wt.-%, more preferably of from 0.0075 to 7.5 wt.-%, even more preferably of from 0.01 to 5 wt.-%, still more preferably of from 0.015 to 2.5 wt.-%, yet more preferably of from 0.02 to 1.5 wt.-%, in particular of from 0.05 to 1 wt.-%, most preferred of from 0.075 to 0.5 wt.-% or of from 0.09 to 0.3 wt.-%, in each case based on the total weight of the drilling fluid. The total amount of all components present in the drilling fluid adds up to 100 wt.-%.

Additional Components of the Drilling Fluid

The inventive drilling fluid may contain at least one further component. Preferably, inventive drilling fluid contains at least one further additive selected from the group consisting of thixotropic agents, emulsifiers, alkalinity imparting components, proppants, fluid loss additives, thinners and viscosifiers. The components are different from each other and are also different from any of the components (A), (B), (C), (D) and (E).

Preferably, the inventive drilling mud contains at least one preferably inorganic thixotropic agent. Thixotropic agents, which impart thickening and gelling properties, used in drilling fluids may include organophilic phyllosilicates (hereinafter referred to as "organoclays"). The organoclays used may be any of those which have substantial base-exchange capacity. Examples of such organoclays include bentonite (such as swelling bentonite), montmorillonite, hectorite, attapulgite, illite, Fuller's earth, beidellite, saponite, sepiolite, vermiculite, zeolites, and mixtures thereof. Exemplary materials based on bentonites are available from BYK Additives Inc. under the trade name CLAYTONE®. A particular example of a mixture of organoclays is GARAMITE®, available from BYK Additives Inc. Organoclays may impart one or more of the following properties on drilling fluids: thickening, gelling, suspension, wellbore-cleaning, etc. Preferably, the at least one thixotropic agent comprises at least one organoclay of bentonite, montmorillonite, hectorite, attapulgite, illite, Fuller's earth, beidellite, saponite, sepiolite, vermiculite, and/or zeolites. Attapulgite, montmorillonite, bentonite, hectorite, saponite, and sepiolite are particularly preferred. The organoclay may be a coated with at least one of at least one quaternary ammonium compound or at least one phosphonium compound. Preferably, the inventive drilling fluid comprises at least one preferably inorganic thixotropic agent such as at least one organoclay in an amount of from 0.01 to 10 wt.-%, more preferably of from 0.025 to 7.5 wt.-%, even more preferably of from 0.05 to 5 wt.-%, still more preferably of from 0.075 to 2.5 wt.-%, in particular of from 0.10 to 1.5 wt.-% or of from 0.15 to 1.0 wt.-%, in each case based on the total weight of the drilling fluid. The total amount of all components present in the drilling fluid adds up to 100 wt.-%.

In a preferred embodiment, however, the inventive drilling fluid does not contain any organoclay ("clay free drilling mud").

Preferably, the inventive drilling mud contains at least one emulsifier. Emulsifiers or emulsifier systems (such as primary and secondary emulsifiers) may form or stabilize the inventive drilling fluid, and/or may serve as wetting agents for solids. Surfactants may be used in the drilling fluids, for emulsifying the aqueous phase and/or as wetting agents for the solid phase(s), and may include alkali and alkaline earth metal salts of fatty acids, fatty acid derivatives, rosin acids, tall oil acids, or synthetic emulsifiers such as alkyl aromatic sulfonates, aromatic alkyl sulfonates, long chain sulfates, oxidized tall oils, carboxylated 2-alkyl imidazolines, imidazoline salts, amido amines, amide-imidoamines, alkoxy phenols, polyalkoxy alcohols, alkyl phenols, ether carboxylates, lecithins, high molecular weight alcohols, polymer surfactants and the like. The emulsifier is different from the other components, which are present or may be present in the inventive drilling fluid, in particular from components (A), (B), (C), (D) and (E).

Preferably, the inventive drilling fluid comprises at least one emulsifier in an amount of from 0.01 to 10 wt.-%, more preferably of from 0.05 to 8 wt.-%, even more preferably of from 0.1 to 7 wt.-%, still more preferably of from 0.2 to 6 wt.-%, in particular of from 0.5 to 5 wt.-% or of from 1.0 to 4.0 wt.-%, in each case based on the total weight of the drilling fluid. The total amount of all components present in the drilling fluid adds up to 100 wt.-%.

Preferably, the inventive drilling mud contains at least one component, which imparts alkalinity to the fluid, i.e. which is used as an alkalinity regulator, and which is in particular different from component (b). Examples of alkalinity imparting components are selected from oxides, hydroxides, carbonates, hydrogen carbonates of alkali and/or alkaline earth metals or mixtures thereof. A preferred example of an alkalinity imparting component is lime ($Ca(OH)_2$). Other alkalinity regulating additives include caustic soda (NaOH), soda ash ($Na_2CO_3$), $NaHCO_3$, CaO, MgO, and $Mg(OH)_2$.

Preferably, the inventive drilling fluid comprises at least one alkalinity imparting compound in an amount of from 0.01 to 10 wt.-%, more preferably of from 0.05 to 8 wt.-%, even more preferably of from 0.1 to 7 wt.-%, still more preferably of from 0.2 to 6 wt.-%, in particular of from 0.3 to 5 wt.-% or of from 0.5 to 3 wt.-%, in each case based on the total weight of the drilling fluid. The total amount of all components present in the drilling fluid adds up to 100 wt.-%.

The drilling mud may contain further components like proppants, $H_2S$ scavengers, fluid loss additives, thinners and viscosifiers; their purpose and typical examples of these components can be found in 'Composition and Properties of Drilling and Completion Fluids' by Ryen Caenn, H. C. H. Darley and George R. Gray, Sixth Edition as well as in 'Drilling Fluids Engineering Manual' by Newpark Drilling Fluids LLC, Houston Tex., Version 2.0 November 2005 and furthermore in 'Drilling Fluids' by Kate van Dyke, 1st edition/5th impression 2012, published by Petroleum Extension Service, Austin/TX.

Drilling Fluid

Preferably, the inventive drilling fluid comprises
- (A) component (A) in an amount of 10 to 60 wt.-%, preferably in an amount of 12.5 to 55 wt.-%,
- (B) component (B) in an amount of 2.5 to 40 wt.-%, preferably in an amount of 5 to 30 wt.-%,
- (C) component (C) in an amount of 10 to 90 wt.-%, preferably in an amount of 15 to 85 wt.-%, and
- (D) component (D) in amount of 0.005 to 8 wt.-%, preferably in an amount of 0.01 to 7 wt.-%, and optionally
- (E) component (E) in an amount of 0 to 5 wt.-%, in each case based on the total weight of the drilling fluid, wherein the total amount of all components present in the drilling fluid adds up to 100 wt.-%.

More preferably, the inventive drilling fluid comprises
- (A) component (A) in an amount of 15 to 50 wt.-%, preferably in an amount of 17.5 to 45 wt.-%,
- (B) component (B) in an amount of 5 to 30 wt.-%, preferably in an amount of 7.5 to 25 wt.-%,
- (C) component (C) in an amount of 20 to 80 wt.-%, preferably in an amount of 30 to 70 wt.-%, and
- (D) component (D) in amount of 0.01 to 6 wt.-%, preferably in an amount of 0.01 to 5 wt.-%, and optionally
- (E) component (E) in an amount of 0 to 5 wt.-%, preferably in an amount of 0.01 to 5 wt.-%, in each case based on the total weight of the drilling fluid, wherein the total amount of all components present in the drilling fluid adds up to 100 wt.-%.

Even more preferably, the inventive drilling fluid comprises
- (A) component (A) in an amount of 20 to 40 wt.-%, preferably in an amount of 25 to 35 wt.-%,
- (B) component (B) in an amount of 10 to 20 wt.-%, preferably in an amount of 12.5 to 17.5 wt.-%,
- (C) component (C) in an amount of 40 to 65 wt.-%, preferably in an amount of 45 to 60 wt.-%, and
- (D) component (D) in amount of 0.01 to 3 wt.-%, preferably in an amount of 0.02 to 2 wt.-%, and optionally
- (E) component (E) in an amount of 0 to 3 wt.-%, preferably in an amount of 0.02 to 3 wt.-%, in each case based on the total weight of the drilling fluid, wherein the total amount of all components present in the drilling fluid adds up to 100 wt.-%.

Use of the Inventively Used (Meth)Acrylic Copolymer as Rheological Agent in Drilling Fluids A further subject-matter of the present invention is a use of the at least one (meth)acrylic copolymer being present as component (D) in the drilling fluid according to the first subject-matter of the present application as rheological additive in a drilling fluid, wherein the drilling fluid is a water-in-oil (W/O) emulsion.

In other words, a further subject-matter of the present invention is a use of at least one (meth)acrylic copolymer as rheological additive in a drilling fluid, wherein the drilling fluid is a water-in-oil (W/O) emulsion and wherein the (meth)acrylic copolymer contains at least one of structural units (D1), (D2) and (D3), which are different from one another,
- structural unit (D1) comprising at least one hydroxyl group and not comprising any amino groups,
- structural unit (D2) comprising at least one amino group and not comprising any hydroxyl groups, and
- structural unit (D3) comprising both at least one hydroxyl group and at least one amino group, and wherein the (meth)acrylic copolymer further contains at least one structural unit (D4), which is different from any of structural units (D1), (D2) and (D3), structural unit (D4) containing the part structure (P)

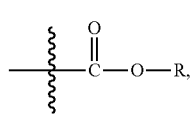
(P)

wherein
the symbol

denotes a covalent bond of part structure (P) to the backbone of the (meth)acrylic copolymer, and R denotes a $C_4$-$C_{25}$ aliphatic residue, preferably a $C_4$-$C_{22}$ aliphatic residue, more preferably a $C_8$-$C_{18}$ aliphatic residue, an aromatic $C_6$-$C_{25}$ residue or an araliphatic $C_7$-$C_{25}$ residue.

All preferred embodiments described above herein in connection with the inventive drilling fluid and the components contained therein, in particular (meth)acrylic copolymer (D), are also preferred embodiments of the use of said at least one (meth)acrylic copolymer as rheological additive in a drilling fluid, wherein the drilling fluid is a water-in-oil (W/O) emulsion.

Preferably, the inventively used (meth)acrylic copolymer influences the rheology of the drilling fluid when used in oil and/or natural gas drilling operations. Preferably, the inventively used (meth)acrylic copolymer provides a flat rheology profile of the drilling fluid. By using the inventively used (meth)acrylic copolymer as rheological additive in drilling fluids, preferably a drilling fluid can be provided that has at least one a Yield Point, 10 minute gel value, and 6 RPM value within +/−20% of the mean values across a temperature range of from from 40° F. to 150° F. (4.4 to 65.5° C.).

Preferably, the (meth)acrylic copolymer is used in combination with at least one component (E) as defined hereinbefore as rheological agent. More preferably, the (meth)acrylic copolymer is used in combination with at least one acid such as at least one organic acid, in particular in combination with at least one organic $C_{10}$-$C_{28}$ fatty acid and/or at least one oligomer such as a dimer and/or trimer of at least one $C_{10}$-$C_{28}$ fatty acid as rheological agent. In particular, the inventively used (meth)acrylic copolymer may be combined with at least one component (E) so that the combination of said (meth)acrylic copolymer and component (E) may be added as a single component to the drilling fluid in order to facilitate handling of the materials upon addition to the drilling fluid.

Method of Producing Oil and/or Natural Gas or of Preparing the Production of Oil and/or Natural Gas A further subject-matter of the present invention is a method of producing oil and/or natural gas or of preparing the production of oil and/or natural gas, comprising the step of using an inventive drilling fluid according for generating and/or operating a drill hole.

All preferred embodiments described above herein in connection with the inventive drilling fluid and the components contained therein, in particular (meth)acrylic copolymer (D), as well as the use of said copolymer as rheological agent in drilling fluids, are also preferred embodiments of the inventive method of producing oil and/or natural gas or of preparing the production of oil and/or natural gas.

Test Methods

Determination of Average Molecular Weights $M_w$, $M_n$ and Polydispersity P

The weight average ($M_w$) molecular weights (and the molecular weight distribution as well as the number average molecular weights ($M_n$)) of the inventively used copolymers or any precursors thereof are determined by GPC-analysis (gel permeation chromatography analysis) according to DIN 55672-1:2007-08 at 40° C. Tetrahydrofuran (THF) was used as the eluent with an elution rate of 1 ml/min. In the case of copolymers having amino groups, 1 vol.-% of dibutylamine was added to the THF eluent used. The conventional calibration was carried out using polystyrene standards having molecular weights between 1,000,000 and 162 g/mol.

EXAMPLES

The following examples further illustrate the invention but are not to be construed as limiting its scope.

1. Raw Materials Used

| Name | Supplier | Description |
| --- | --- | --- |
| Shellsol ® A | Overlack AG, Germany | Mixture of aromatic hydrocarbons |
| Amodrill ® 1000 | Ineos Oligomers | Mixture of synthetic olefins |
| Dowanol ® PMA | Dow Chemical Company | Propylene glycol methyl ether acetate |
| THF | Sigma Aldrich | Tetrahydrofuran |
| Claytone-3 ® | BYK Chemie GmbH, Wesel, Germany | Alkyl quaternary ammonium bentonite |
| EnvaMul ® 1767 | WestRock; Richmond, Virginia, United States | Modified tall oil (emulsifier) |
| 25% CaCl$_2$ Brine | Sigma-Aldrich; St. Louis, Missouri, USA | Aqueous solution of CaCl$_2$ (25 wt.-%) |
| MI Wate 4.1 | M-I SWACO; Houston, Texas, USA) | Barium sulfate based product for increasing the density of drilling fluids |
| Rev dust | Ofite; Houston, Texas, USA | Hydrated Sodium Calcium Aluminosilicate |
| Lime | Zeller's Hardware Store; Louisville, Kentucky, United States | Ca(OH)$_2$ |
| Thixatrol ® DW50 | Elementis Specialties, Inc | Rheology viscosifier for oil based drilling fluids (comparatively used) |
| Empol ® 1043 | BASF AG; Ludwigshafen, Germany | Trimeric fatty acid |

2. Comparative Examples 2.1 Comparative Example CEX1

A four-necked round-bottom flask equipped with stirrer, thermometer und reflux condenser is charged with 70.2 g Shellsol® A and heated up to 120° C. under nitrogen atmosphere. A mixture of 75.0 g lauryl methacrylate, 29.2 g 2-ethylhexyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=14227; $M_w$=61350; P=4.31).

2.2 Comparative Example CEX2

Comparative example CEX2 corresponds to example 3 of US 2015/0376490 A1.

2.3 Comparative Example CEX3

Comparative example CEX3 corresponds to example 2 of U.S. Pat. No. 7,345,010.

2.4 Comparative Example CEX4

Comparative example CEX4 corresponds to example 4 of US 2015/0376490 A1.

2.5 Comparative Example CEX5

Comparative example CEX5 corresponds to Thixatrol® DW50.

2.6 Comparative Example CEX6

A four-necked round-bottom flask equipped with stirrer, thermometer und reflux condenser is charged with 87.7 g Dowanol PMA and heated up to 120° C. under nitrogen atmosphere. A mixture of 45.0 g lauryl methacrylate, 35.1 g 2-ethylhexyl methacrylate, 4.6 g methacrylic acid and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a highly viscous, yellow liquid (GPC: $M_n$=12744; $M_w$=102760; calculated acid number of the polymer as such: 55.3 mg KOH/g).

2.7 Comparative Example CEX7

A four-necked round-bottom flask equipped with stirrer, thermometer und reflux condenser is charged with 79.3 g Dowanol PMA and heated up to 120° C. under nitrogen atmosphere. A mixture of 37.4 g lauryl methacrylate, 29.2 g 2-ethylhexyl methacrylate, 12.7 g methacrylic acid and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a highly viscous, yellow liquid (GPC: $M_n$=14315; $M_w$=129394; calculated acid number of the polymer as such: 102.0 mg KOH/g).

3. Inventive Examples

All calculated values for amine and hydroxyl numbers refer to the pure polymer as such.

3.1 Example EX1

A four-necked round-bottom flask equipped with stirrer, thermometer und reflux condenser is charged with 60.7 g Shellsol® A und heated up to 120° C. under nitrogen atmosphere. A mixture of 45.3 g lauryl methacrylate, 15 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a high viscous, orange liquid (GPC: $M_n$=14711; $M_w$=105616; P=7.18). The calculated amine number is 108 mg KOH/g.

3.2 Example EX2

A four-necked round-bottom flask equipped with stirrer, thermometer und reflux condenser is charged with 47.6 g Shellsol® A und heated up to 120° C. under nitrogen atmosphere. A mixture of 37.8 g butyl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a high viscous, orange liquid (GPC: $M_n$=13724; $M_w$=105931; P=7.72). The calculated amine number is 34 mg KOH/g.

3.3 Example EX3

A four-necked round-bottom flask equipped with stirrer, thermometer und reflux condenser is charged with 66.5 g Shellsol® A und heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colourless liquid (GPC: $M_n$=9580; $M_w$=72323; P=7.55). The calculated OH number is 24 mg KOH/g.

3.4 Example EX4

A four-necked round-bottom flask equipped with stirrer, thermometer und reflux condenser is charged with 66.7 g Shellsol® A and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colourless liquid (GPC: $M_n$=8917; $M_w$=57746; P=6.48). The calculated OH number is 24 mg KOH/g.

3.5 Example EX5

A four-necked round-bottom flask equipped with stirrer, thermometer und reflux condenser is charged with 67.5 g Shellsol® A and heated up to 120° C. under nitrogen atmosphere. A mixture of 67.7 g lauryl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, red liquid (GPC: $M_n$=13944; $M_w$=72619; P=5.21). The calculated amine number is 24 mg KOH/g.

3.6 Example EX6

A four-necked round-bottom flask equipped with stirrer, thermometer und reflux condenser is charged with 70.2 g Amodrill® 1000 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colourless liquid (GPC: $M_n$=10268; $M_w$=60175; P=5.86). The calculated OH number is 24 mg KOH/g.

3.7 Example EX7

A four-necked round-bottom flask equipped with stirrer, thermometer und reflux condenser is charged with 70.2 g Shellsol® A and heated up to 120° C. under nitrogen atmosphere. A mixture of 67.7 g lauryl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, orange liquid (GPC: $M_n$=9442; $M_w$=36244; P=3.84). The calculated amine number is 24 mg KOH/g.

3.8 Example EX8

A four-necked round-bottom flask equipped with stirrer, thermometer und reflux condenser is charged with 66.8 g Amodrill® 1000 and 0.59 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colourless liquid (GPC: $M_n$=8576; $M_w$=29214; P=3.41). The calculated OH number is 20 mg KOH/g.

3.9 Example EX9

A four-necked round-bottom flask equipped with stirrer, thermometer und reflux condenser is charged with 66.8 g Amodrill® 1000 and 0.295 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=9208; $M_w$=43023; P=4.67). The calculated OH number is 20 mg KOH/g.

3.10 Example EX10

A four-necked round-bottom flask equipped with stirrer, thermometer und reflux condenser is charged with 67.2 g Amodrill® 1000 and 1.18 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, milky liquid (GPC: $M_n$=8952; $M_w$=39182; P=4.38). The calculated OH number is 20 mg KOH/g.

3.11 Example EX11

A four-necked round-bottom flask equipped with stirrer, thermometer und reflux condenser is charged with 67.2 g Amodrill® 1000 and 0.88 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, milky liquid (GPC: $M_n$=7579; $M_w$=33620; P=4.44). The calculated OH number is 20 mg KOH/g.

3.12 Example EX12

A four-necked round-bottom flask equipped with stirrer, thermometer und reflux condenser is charged with 68.0 g Amodrill® 1000 and 2.36 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, milky liquid (GPC: $M_n$=7457; $M_w$=31640; P=4.24). The calculated OH number is 20 mg KOH/g.

3.13 Example EX13

A four-necked round-bottom flask equipped with stirrer, thermometer und reflux condenser is charged with 68.0 g Amodrill® 1000 and 1.77 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=7177; $M_w$=30452; P=4.24). The calculated OH number is 20 mg KOH/g.

3.14 Example EX14

A four-necked round-bottom flask equipped with stirrer, thermometer und reflux condenser is charged with 71.5 g Amodrill® 1000 and 7.55 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 3.74 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=3165; $M_w$=9331; P=2.95). The calculated OH number is 18 mg KOH/g.

3.15 Example EX15

A four-necked round-bottom flask equipped with stirrer, thermometer und reflux condenser is charged with 70.4 g Amodrill® 1000 and 3.78 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 5.7 g 2-hydroxyethyl methacrylate and 1.87 g tert-butylperoxy-2-ethylhexyl carbonate is added by a dosing pump with a rate of 2.0 mL per minute. After one hour reaction time 0.27 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=4260; $M_w$=14542; P=3.41). The calculated OH number is 19 mg KOH/g.

3.16 Example EX16

A four-necked round-bottom flask equipped with stirrer, thermometer und reflux condenser is charged with 57.0 g Amodrill® 1000 and heated up to 120° C. under nitrogen atmosphere. A mixture of 52.7 g lauryl methacrylate, 20.6 g 2-ethylhexyl methacrylate, 12.2 g 2-hydroxyethyl methacrylate and 0.48 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a high viscous, colorless liquid (GPC: $M_n$=9585; $M_w$=66570; P=6.95). The calculated OH number is 51 mg KOH/g.

3.17 Example EX17

A four-necked round-bottom flask equipped with stirrer, thermometer und reflux condenser is charged with 57.0 g Shellsol® A and heated up to 120° C. under nitrogen atmosphere. A mixture of 52.7 g lauryl methacrylate, 20.6 g 2-ethylhexyl methacrylate, 12.2 g 2-hydroxyethyl methacrylate and 0.48 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, colorless liquid (GPC: $M_n$=6784; $M_w$=63826; P=9.41). The calculated OH number is 51 mg KOH/g.

3.18 Example EX18

A four-necked round-bottom flask equipped with stirrer, thermometer und reflux condenser is charged with 57.6 g Amodrill® 1000 and heated up to 120° C. under nitrogen atmosphere. A mixture of 52.7 g lauryl methacrylate, 20.6 g 2-ethylhexyl methacrylate, 6.1 g 2-hydroxyethyl methacrylate, 6.9 g 2-(dimethylamino)ethyl methacrylate and 0.48 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=10868; $M_w$=50933; P=4.69). The calculated OH number is 33 mg KOH/g. The calculated amine number is 31 mg KOH/g.

3.19 Example EX19

A four-necked round-bottom flask equipped with stirrer, thermometer und reflux condenser is charged with 64.6 g Shellsol® A and heated up to 120° C. under nitrogen atmosphere. A mixture of 59.5 g lauryl methacrylate, 23.0 g 2-ethylhexyl methacrylate, 13.8 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=15119; $M_w$=95688; P=6.33). The calculated amine number is 51 mg KOH/g.

3.20 Example EX20

A four-necked round-bottom flask equipped with stirrer, thermometer und reflux condenser is charged with 68.8 g Shellsol® A and heated up to 120° C. under nitrogen atmosphere. A mixture of 71.4 g lauryl methacrylate, 27.6 g 2-ethylhexyl methacrylate, 3.5 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=13086; $M_w$=79470; P=6.07). The calculated amine number is 12 mg KOH/g.

3.21 Example EX21

A four-necked round-bottom flask equipped with stirrer, thermometer und reflux condenser is charged with 67.5 g Shellsol® A and 0.52 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=12604; $M_w$=63452; P=5.03). The calculated amine number is 24 mg KOH/g.

3.22 Example EX22

A four-necked round-bottom flask equipped with stirrer, thermometer und reflux condenser is charged with 67.5 g Shellsol® A and 0.78 g 2,4-Diphenyl-4-methylpentene-1 and heated up to 120° C. under nitrogen atmosphere. A mixture of 67.7 g lauryl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=12094; $M_w$=57455; P=4.75). The calculated amine number is 24 mg KOH/g.

3.23 Example EX23

A four-necked round-bottom flask equipped with stirrer, thermometer und reflux condenser is charged with 47.6 g Shellsol® A and heated up to 120° C. under nitrogen atmosphere. A mixture of 37.8 g lauryl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=13724; $M_w$=105931; P=7.72). The calculated amine number is 34 mg KOH/g.

3.24 Example EX24

A four-necked round-bottom flask equipped with stirrer, thermometer und reflux condenser is charged with 40.3 g Shellsol® A and heated up to 120° C. under nitrogen atmosphere. A mixture of 26.6 g methyl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a high viscous, yellow liquid (GPC: $M_n$=14258; $M_w$=119283; P=8.37). The calculated amine number is 40 mg KOH/g.

3.25 Example EX25

A four-necked round-bottom flask equipped with stirrer, thermometer und reflux condenser is charged with 47.6 g Amodrill® 1000 and heated up to 120° C. under nitrogen atmosphere. A mixture of 37.8 g butyl methacrylate, 26.2 g 2-ethylhexyl methacrylate, 6.9 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a high viscous, yellow liquid (GPC: $M_n$=11192; $M_w$=59841; P=5.35). The calculated amine number is 34 mg KOH/g.

3.26 Example EX26

A four-necked round-bottom flask equipped with stirrer, thermometer und reflux condenser is charged with 27.8 g Amodrill® 1000 and 27.8 g 1-methoxy-2-propylacetate heated up to 120° C. under nitrogen atmosphere. A mixture of 60.4 g lauryl methacrylate, 22.7 g 2-ethylhexyl methacrylate, 11.5 g 2-hydroxyethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a high viscous, yellow liquid (GPC: $M_n$=10171; $M_w$=77857; P=7.65). The calculated OH number is 51 mg KOH/g.

3.27 Example EX27

A four-necked round-bottom flask equipped with stirrer, thermometer und reflux condenser is charged with 70.2 g Amodrill® 1000 heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a high viscous, yellow liquid (GPC: $M_n$=9343; $M_w$=43124; P=4.62). The calculated OH number is 24 mg KOH/g.

3.28 Example EX28

A four-necked round-bottom flask equipped with stirrer, thermometer und reflux condenser is charged with 60.7 g Amodrill® 1000 and heated up to 120° C. under nitrogen atmosphere. A mixture of 45.3 g lauryl methacrylate, 17.5 g 2-ethylhexyl methacrylate, 27.7 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=12885; $M_w$=69354; P=5.38). The calculated amine number is 107 mg KOH/g.

3.29 Example EX29

AA four-necked round-bottom flask equipped with stirrer, thermometer und reflux condenser is charged with 60.7 g Amodrill® 1000 and heated up to 120° C. under nitrogen atmosphere. A mixture of 60.9 g lauryl methacrylate, 23.8 g 2-ethylhexyl methacrylate, 3.1 g 2-(dimethylamino)ethyl methacrylate, 3.1 g 2-hydroxyethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=10706; $M_w$=56714; P=5.30). The calculated OH number is 12 mg KOH/g. The calculated amine number is 12 mg KOH/g.

3.30 Example EX30

A four-necked round-bottom flask equipped with stirrer, thermometer und reflux condenser is charged with 69.3 g Amodrill® 1000 and 3.8 g 2,4-diphenyl-4-methyl-1-pentene and heated up to 120° C. under nitrogen atmosphere. A mixture of 67.7 g lauryl methacrylate, 26.2 g 2-ethylhexyl methacrylate, 5.7 g 2-hydroxyethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=5954; $M_w$=22364; P=3.76). The calculated OH number is 24 mg KOH/g.

3.31 Example EX31

A four-necked round-bottom flask equipped with stirrer, thermometer und reflux condenser is charged with 55.6 g Amodrill® 1000 and heated up to 120° C. under nitrogen atmosphere. A mixture of 60.4 g lauryl methacrylate, 22.7 g 2-ethylhexyl methacrylate, 11.5 g 2-hydroxyethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=10139; $M_w$=59066; P=5.83). The calculated OH number is 51 mg KOH/g.

3.32 Example EX32

A four-necked round-bottom flask equipped with stirrer, thermometer und reflux condenser is charged with 62.9 g Amodrill 1000 and 3.8 g 2,4-diphenyl-4-methyl-1-pentene and heated up to 120° C. under nitrogen atmosphere. A mixture of 45.3 g lauryl methacrylate, 17.5 g 2-ethylhexyl methacrylate, 27.7 g 2-(dimethylamino)ethyl methacrylate and 0.54 g tert-butylperoxy-2-ethylhexyl carbonate is added by a dosing pump with a rate of 2.0 mL per minute. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=8204; $M_w$=23075; P=2.81). The calculated amine number is 103 mg KOH/g.

3.33 Example EX33

A four-necked round-bottom flask equipped with stirrer, thermometer und reflux condenser is charged with 60.9 g Amodrill® 1000 and heated up to 120° C. under nitrogen atmosphere. A mixture of 45.1 g lauryl methacrylate, 17.5 g 2-ethylhexyl methacrylate, 27.5 g 2-(dimethylamino)ethyl methacrylate and 0.54 g tert-butylperoxy-2-ethylhexyl carbonate was prepared. 95 wt. % of the mixture were added by a dosing pump with a rate of 2.0 mL per minute. The residual 5 wt. % of the mixture were mixed with 4.5 g tripropylene glycol diacrylate and were then added using the same rate. After one hour reaction time 0.24 g tert-butylperoxy-2-ethylhexyl carbonate is added. This procedure is repeated five times every 60 min. After the complete addition of the initiator the mixture is stirred for another 3 hours at 120° C. The product is a viscous, yellow liquid (GPC: $M_n$=10324; $M_w$=49982; P=4.84). The calculated amine number is 102 mg KOH/g.

3.34 Example EX34

A four-necked round-bottom flask equipped with stirrer, thermometer und reflux condenser is charged with 96.4 g dry THF and cooled down to 4° C. under nitrogen atmosphere. A mixture of 78.0 g butyl methacrylate and 54.4 g 2-ethylhexyl methacrylate is added by a dosing pump with a rate of 2.5 mL per minute. 1.67 g 1-trimethylsiloxy-1-methoxy-2-methylpropene is added after the addition of 12.4 mL of the monomer mixture. After the addition of 14.9 mL monomer mixture, 0.17 g tetrabutylammonium chlorobenzoate is added. After finishing the monomer addition, the temperature is kept at 20° C. 14.4 g 2-(dimethylamino)ethyl methacrylate is added by a dosing pump with a rate of 0.5 mL per minute. The mixture is stirred for 1 hour without cooling. The solvent is evaporated under vacuum and replaced by Dowanol® PMA to yield a 60 wt. % solution. The product is a viscous, yellow liquid (GPC: $M_n$=15353; $M_w$=21187; P=1.38). The calculated amine number is 35 mg KOH/g.

3.35 Example EX35

A four-necked round-bottom flask equipped with stirrer, thermometer and reflux condenser is charged with 96.4 g THF and cooled down to 4° C. under nitrogen atmosphere. A mixture of 78.0 g butyl methacrylate, 54.4 g 2-ethylhexyl methacrylate and 14.4 g 2-(dimethylamino)ethyl methacrylate is added by a dosing pump with a rate of 2.8 mL per minute. 1.67 g 1-Trimethylsiloxy-1-methoxy-2-methylpropene is added after the dosage of 13.6 mL of the monomer mixture. After the addition of 16.4 mL of the monomer mixture, 0.17 g tetrabutylammonium chlorobenzoate is added. After finishing the monomer addition, the temperature is kept at 20° C. The mixture is stirred for 1 hour without cooling. The solvent is evaporated under vacuum and replaced by Dowanol® PMA to yield a 60 wt. % solution. The product is a viscous, yellow liquid (GPC: $M_n$=15402; $M_w$=24884; P=1.62). The calculated amine number is 35 mg KOH/g.

4. Application of the Comparative and Inventive Rheology Additives in Drilling Mud Systems 4.1 An exemplary drilling fluid formulation comprising an oil phase with an emulsified water phase containing dissolved salts is disclosed hereinafter in Table 1 with concentrations reported in parts by weight (pbw). Table 1 shows the components used, their amounts as well as how long to mix the components on the Silverson® mixer as further described hereinafter. The components are mixed in the sequence as indicated by the entries in Table 1: The oil based drilling formulation was prepared by first weighing the Amodrill® 1000 hydrocarbon product into a blending cup. The additional components as indicated in "entries 2 to 8" of Table 1 were added and mixed sequentially according to Table 1 using a high shear mixer (Silverson® L4RT High Shear Mixer, Silverson Machines Inc., East Longmeadow, Mass., USA). For example, after the Amodrill® 1000 and Claytone-3 ® products were combined, the samples in preparation were mixed for 5 minutes. After 5 minutes the "rheological additive" was added to the blending cup while mixing. After the addition of all components, the sample was mixed 5 minutes at 6,000 RPM and then incubated at 25° C. in a water bath for 1½ hours.

TABLE 1

| General formulation for a drilling Fluid (DF) | | | |
|---|---|---|---|
| Entry | Component | pbw | Minutes to mix |
| 1 | Amodrill ® 1000 | 151.2 | |
| 2 | Claytone-3 | 1 | 5 |
| 3 | "Rheological Additive" | cf. below | 5 |
| 4 | Lime | 6 | 5 |
| 5 | EnvaMul ® 1767 | 15 | 5 |
| 6 | 25% $CaCl_2$ Brine | 85.1 | 10 |
| 7 | MI Wate 4.1 | 270.3 | 10 |
| 8 | Rev dust | 20 | 10 |

The "rheological additive" corresponds to either one of comparative examples CEX1 to CEX7 or to one of inventive examples 1 to 35. Optionally, the "rheological additive" may in case additionally contain a fatty acid component, which is a dimeric or trimeric fatty acid, or a blend thereof.

The "rheological additive" corresponds to either one of comparative examples CEX1 to CEX7 or to one of inventive examples 1 to 35. Optionally, the "rheological additive" may in case additionally contain a fatty acid component, which is a dimeric or trimeric fatty acid, or a blend thereof.

4.2 Fifteen individualized drilling fluid systems as described in Table 1 containing inventive or comparative rheological additives or no rheological additive at all were evaluated (DF1 to DF15) and compared to each other. These drilling fluid systems DF1 to DF15 differ from each other only in the "rheological additive" used. Table 2 shows which "rheological additive" has been used for each of DF1 to DF15. In Table 2 "ppb" means "pounds per barrel". All rheological additives EX1, EX2, EX3, EX25, EX26, EX35 as well as CEX1 to CEX7 were used in form of a 60 wt.-% formulation as described in item 3. of the experimental part hereinbefore. Thus, the respective copolymers as such were used in an amount of 0.3 ppb in each case. All values given in "ppb" can be recalculated to SI units using the following relationship: 1 ppb=2.85 kg/m³.

TABLE 2

Drilling fluid formulations DF1 to DF15

| Drilling fluid formulation | Inventive or comparative example no. | Functionality of the (meth)acrylic copolymer according to inventive or comparative example | Amount of inventive or comparative example used | (Additional) presence of fatty acid component* |
|---|---|---|---|---|
| DF1 | EX 1 | Amino | 0.5 ppb | Yes, 1 ppb |
| DF2 | EX2 | Amino | 0.5 ppb | Yes, 1 ppb |
| DF3 | EX3 | Hydroxyl | 0.5 ppb | Yes, 1 ppb |
| DF4 | EX25 | Amino | 0.5 ppb | Yes, 1 ppb |
| DF5 | EX26 | Hydroxyl | 0.5 ppb | Yes, 1 ppb |
| DF6 | EX35 | Amino | 0.5 ppb | Yes, 1 ppb |
| DF7 | none | — | — | — |
| DF8 | none | — | — | Yes, 1 ppb |
| DF9 | CEX1 | non-functional | 0.5 ppb | Yes, 1 ppb |
| DF10 | CEX4 | — | 0.5 ppb | Yes, 1 ppb |
| DF11 | CEX2 | — | 0.5 ppb | Yes, 1 ppb |
| DF12 | CEX3 | — | 0.5 ppb | Yes, 1 ppb |
| DF13 | CEX5 | — | 0.5 ppb | Yes, 1 ppb |
| DF14 | CEX6 | Carboxyl | 0.5 ppb | Yes, 1 ppb |
| DF15 | CEX7 | Carboxyl | 0.5 ppb | Yes, 1 ppb |

*Empol ® 1043 trimeric fatty acid has been used as fatty acid component.

All drilling fluid formulations were aged at 150° F. (65.5° C.) for 16 hours to simulate real world conditions in a roller oven (OFITE 5-Roller Oven, OFI Testing Equipment Inc., Houston, Tex., USA).

4.3 To test the drilling mud, a 150 mL volume was poured into a glass beaker and placed on a viscometer with attached temperature probe (OFITE Model 900 Viscometer, OFI Testing Equipment Inc., Houston, Tex., USA). To adjust the drilling mud to the desired temperature (40° F. (4.4° C.), 100° F. (37.7° C.) and 150° F. (65.5° C.)) an external heat transfer device (Caron Model 2050-1, Caron Products & Services, Inc., Marietta, Ohio, USA) was utilized. The viscometer was then run according to manufacturer instructions and the values recorded for each desired frequency of rotation (600 RPM, 300 RPM, 200 RPM, 100 RPM, 6 RPM and 3 RPM). "Yield point" and "gel strength" were also calculated when evaluating the drilling muds.

Yield point (YP) is a measurement of the attractive forces that cause the mud to resist flow. A proper yield point helps lift cuttings out of the annulus and reduce pressure changes that must be accounted for during the drilling process. A constant yield point across temperature changes increases drilling efficiency by preventing formation influx (i.e. the undesirable flow of formation fluid into the wellbore) and lost-circulation problems. The yield point is calculated from 300 RPM and 600 RPM values according to Equation 1:

Plastic viscosity (PV)=600RPM value−300RPM value

Yield point (YP)=300RPM value−PV          Equation 1:

Gel strength is similar to yield point in causing a sudden pressure change at the start of pumping. However, the major difference between yield point and gel strength is that gel strength will not exist once the fluid is moving (i.e. after the gel has been broken). This contrasts yield point which effects will not disappear when the fluid is in motion. More specifically, gel strength defines the ability of the drilling mud to suspend drill solids and weighting materials when circulation ceases. To measure the gel strength, the viscometer is turned to 600 rpm for 15 seconds and quickly changed to 3 RPM before turning the instrument off for 10 seconds. After the allotted time the viscometer is turned back on and the highest peak reading is recorded as the 10 second gel strength (10"). This process is repeated, with an instrument rest time of 10 minutes, to record the 10 minute gel strength (10').

For a flat rheological profile, one skilled in the art identifies 6 RPM, 10 minute gel (10'), and yield point (YP) as the focus of drilling fluid rheological properties. In regards to 6 RPM, 10' gel, and YP, a system is considered to have a flat rheology profile when these values are within +/−20% of the mean values across temperature ranges from 40° F. to 150° F. (4.4° C. to 65.5° C.). Lower percent variations for 6 RPM, 10' gel, and yield point indicate a flatter rheological profile. To best optimize the flat rheology profile, the 6 RPM, 10 minute gel, and yield point properties should all fall within these parameters.

4.4 The rheological properties of the individualized drilling fluids were measured as described in item 4.3. These results are summarized in Tables 3a to 3m as set out hereinafter.

In these Tables viscosities are listed in readings (i.e., dial readings as defined in "Dictionary of Petroleum Exploration, Drilling & Production" by Norman Hyne, $2^{nd}$ Edition, January 1991, published by PennWell Corp., Tulsa, Okla., USA), "gel" is measured in pounds per 100 square feet [lb/100 ft$^2$], "PV" is plastic viscosity and is measured in centipoise units [cP], "YP" is yield point and is measured in pounds per 100 square feet [lb/100 ft$^2$]. Values given in pounds per 100 square feet [lb/100 ft$^2$] can be recalculated to SI units using the following relationship: 1 lb/100 ft$^2$=0.0488 kg/m$^2$. Values given in centipoise [cP] can be recalculated to SI units using the following relationship: 1 cP=0.001 pascal second [Pa·s].

TABLE 3a

Drilling fluid DF7 (comparative, no rheological additive)

| Properties | 40° F. (4.4° C.) | 100° F. (37.7° C.) | 150° F. (65.5° C.) |
|---|---|---|---|
| 600 RPM reading | 132 | 64 | 58 |
| 300 RPM reading | 80 | 48 | 31 |
| 200 RPM reading | 62 | 28 | 24 |
| 100 RPM reading | 38 | 20 | 17 |
| 6 RPM reading | 12 | 7 | 6 |
| 3 RPM reading | 10 | 6 | 5 |
| 10" gel [lb/100 ft$^2$] | 11 | 6 | 5 |
| 10' gel [lb/100 ft$^2$] | 10 | 6 | 5 |
| PV [cP] | 52 | 16 | 27 |
| YP [lb/100 ft$^2$] | 28 | 32 | 4 |

TABLE 3b

Drilling fluid DF8 (comparative, only fatty acid component)

| Properties | 40° F. (4.4° C.) | 100° F. (37.7° C.) | 150° F. (65.5° C.) |
|---|---|---|---|
| 600 RPM reading | 148 | 80 | 65 |
| 300 RPM reading | 80 | 47 | 45 |
| 200 RPM reading | 61 | 37 | 35 |
| 100 RPM reading | 38 | 26 | 27 |
| 6 RPM reading | 11 | 12 | 15 |
| 3 RPM reading] | 10 | 11 | 13 |
| 10" gel [lb/100 ft$^2$] | 12 | 13 | 14 |
| 10' gel [lb/100 ft$^2$] | 22 | 20 | 20 |
| PV [cP] | 68 | 33 | 20 |
| YP [lb/100 ft$^2$] | 12 | 14 | 25 |

TABLE 3c

| Drilling fluid DF1 (inventive) | | | |
|---|---|---|---|
| Properties | 40° F. (4.4° C.) | 100° F. (37.7° C.) | 150° F. (65.5° C.) |
| 600 RPM reading | 216 | 83 | 69 |
| 300 RPM reading | 118 | 57 | 50 |
| 200 RPM reading | 83 | 47 | 39 |
| 100 RPM reading | 49 | 26 | 29 |
| 6 RPM reading | 13 | 12 | 15 |
| 3 RPM reading | 11 | 13 | 13 |
| 10" gel [lb/100 ft$^2$] | 14 | 12 | 15 |
| 10' gel [lb/100 ft$^2$] | 25 | 21 | 22 |
| PV [cP] | 98 | 26 | 19 |
| YP [lb/100 ft$^2$] | 20 | 31 | 31 |

TABLE 3d

| Drilling fluid DF2 (inventive) | | | |
|---|---|---|---|
| Properties | 40° F. (4.4° C.) | 100° F. (37.7° C.) | 150° F. (65.5° C.) |
| 600 RPM reading | 220 | 96 | 62 |
| 300 RPM reading | 121 | 59 | 38 |
| 200 RPM reading | 88 | 46 | 32 |
| 100 RPM reading | 54 | 30 | 26 |
| 6 RPM reading | 13 | 12 | 17 |
| 3 RPM reading | 12 | 11 | 18 |
| 10" gel [lb/100 ft$^2$] | 14 | 13 | 16 |
| 10' gel [lb/100 ft$^2$] | 22 | 20 | 22 |
| PV [cP] | 99 | 37 | 24 |
| YP [lb/100 ft$^2$] | 22 | 22 | 14 |

TABLE 3e

| Drilling fluid DF3 (inventive) | | | |
|---|---|---|---|
| Properties | 40° F. (4.4° C.) | 100° F. (37.7° C.) | 150° F. (65.5° C.) |
| 600 RPM reading | 194 | 103 | 75 |
| 300 RPM reading | 107 | 63 | 45 |
| 200 RPM reading] | 80 | 48 | 37 |
| 100 RPM reading | 50 | 33 | 29 |
| 6 RPM reading | 15 | 13 | 16 |
| 3 RPM reading | 12 | 11 | 13 |
| 10" gel [lb/100 ft$^2$] | 16 | 13 | 15 |
| 10' gel [lb/100 ft$^2$] | 26 | 22 | 24 |
| PV [cP] | 87 | 40 | 30 |
| YP [lb/100 ft$^2$] | 20 | 23 | 15 |

TABLE 3f

| Drilling fluid DF4 (inventive) | | | |
|---|---|---|---|
| Properties | 40° F. (4.4° C.) | 100° F. (37.7° C.) | 150° F. (65.5° C.) |
| 600 RPM reading | 181 | 80 | 69 |
| 300 RPM reading | 101 | 47 | 42 |
| 200 RPM reading | 72 | 36 | 34 |
| 100 RPM reading | 42 | 24 | 25 |
| 6 RPM reading | 11.2 | 9.5 | 13.3 |
| 3 RPM reading | 9.2 | 8.3 | 12.2 |
| 10" gel [lb/100 ft$^2$] | 12 | 10 | 13 |
| 10' gel [lb/100 ft$^2$] | 20 | 19 | 21 |
| PV [cP] | 80 | 33 | 27 |
| YP [lb/100 ft$^2$] | 21 | 14 | 15 |

TABLE 3g

| Drilling fluid DF5 (inventive) | | | |
|---|---|---|---|
| Properties | 40° F. (4.4° C.) | 100° F. (37.7° C.) | 150° F. (65.5° C.) |
| 600 RPM reading | 185 | 82 | 75 |
| 300 RPM reading | 102 | 47 | 46 |
| 200 RPM reading | 73 | 36 | 37 |
| 100 RPM reading] | 44 | 25 | 27 |
| 6 RPM reading | 11.7 | 10.2 | 13.4 |
| 3 RPM reading | 10 | 9 | 12 |
| 10" gel [lb/100 ft$^2$] | 12.9 | 10.3 | 13.1 |
| 10' gel [lb/100 ft$^2$] | 21 | 19.7 | 21.5 |
| PV [cP] | 83 | 35 | 29 |
| YP [lb/100 ft$^2$] | 19 | 12 | 17 |

TABLE 3h

| Drilling fluid DF6 (inventive) | | | |
|---|---|---|---|
| Properties | 40° F. (4.4° C.) | 100° F. (37.7° C.) | 150° F. (65.5° C.) |
| 600 RPM reading | 200 | 79 | 65 |
| 300 RPM reading | 109 | 45 | 39 |
| 200 RPM reading | 77 | 34 | 32 |
| 100 RPM reading | 45 | 24 | 24 |
| 6 RPM reading | 11.5 | 11 | 13 |
| 3 RPM reading | 9.3 | 9.3 | 11.8 |
| 10" gel [lb/100 ft$^2$] | 12 | 10.3 | 13.3 |
| 10' gel [lb/100 ft$^2$] | 20.6 | 19.9 | 20.7 |
| PV [cP] | 91 | 34 | 26 |
| YP [lb/100 ft$^2$] | 18 | 11 | 13 |

TABLE 3i

| Drilling fluid DF9 (comparative) | | | |
|---|---|---|---|
| Properties | 40° F. (4.4° C.) | 100° F. (37.7° C.) | 150° F. (65.5° C.) |
| 600 RPM reading | 234 | 90 | 66 |
| 300 RPM reading | 118 | 47 | 50 |
| 200 RPM reading | 84 | 37 | 40 |
| 100 RPM reading | 52 | 27 | 30 |
| 6 RPM reading | 16 | 13 | 16 |
| 3 RPM reading | 13 | 11 | 13 |
| 10" gel [lb/100 ft$^2$] | 17 | 14 | 16 |
| 10' gel [lb/100 ft$^2$] | 26 | 23 | 22 |
| PV [cP] | 116 | 43 | 16 |
| YP [lb/100 ft$^2$] | 2 | 4 | 34 |

TABLE 3j

| Drilling fluid DF10 (comparative) | | | |
|---|---|---|---|
| Properties | 40° F. (4.4° C.) | 100° F. (37.7° C.) | 150° F. (65.5° C.) |
| 600 RPM reading | 193 | 78 | 66 |
| 300 RPM reading] | 108 | 45 | 39 |
| 200 RPM reading | 75 | 33 | 31 |
| 100 RPM reading | 43 | 22 | 22 |
| 6 RPM reading | 9.4 | 8.3 | 11.2 |
| 3 RPM reading | 7.1 | 7 | 10.1 |
| 10" gel [lb/100 ft$^2$] | 9.8 | 8.9 | 11.6 |
| 10' gel [lb/100 ft$^2$] | 18.3 | 19.3 | 20.8 |
| PV [cP] | 85 | 33 | 27 |
| YP [lb/100 ft$^2$] | 23 | 12 | 12 |

TABLE 3k

Drilling fluid DF11 (comparative)

| Properties | 40° F. (4.4° C.) | 100° F. (37.7° C.) | 150° F. (65.5° C.) |
|---|---|---|---|
| 600 RPM reading | 208 | 89 | 68 |
| 300 RPM reading | 113 | 48 | 40 |
| 200 RPM reading] | 81 | 36 | 33 |
| 100 RPM reading | 47 | 24 | 24 |
| 6 RPM reading | 11.5 | 8.5 | 13.3 |
| 3 RPM reading | 9.4 | 7.6 | 12.2 |
| 10" gel [lb/100 ft$^2$] | 12.7 | 10.1 | 13.2 |
| 10' gel [lb/100 ft$^2$] | 23.9 | 19 | 22.2 |
| PV [cP] | 95 | 41 | 28 |
| YP [lb/100 ft$^2$] | 18 | 7 | 12 |

TABLE 3l

Drilling fluid DF12 (comparative)

| Properties | 40° F. (4.4° C.) | 100° F. (37.7° C.) | 150° F. (65.5° C.) |
|---|---|---|---|
| 600 RPM reading | 206 | 85 | 66 |
| 300 RPM reading] | 112 | 47 | 39 |
| 200 RPM reading | 80 | 35 | 31 |
| 100 RPM reading | 46 | 22 | 22 |
| 6 RPM reading | 10.2 | 7.8 | 12.5 |
| 3 RPM reading | 7.3 | 6.7 | 12 |
| 10" gel [lb/100 ft$^2$] | 9.7 | 10.7 | 17.9 |
| 10' gel [lb/100 ft$^2$] | 20.9 | 22.5 | 26.1 |
| PV [cP] | 94 | 38 | 27 |
| YP [lb/100 ft$^2$] | 18 | 9 | 12 |

TABLE 3m

Drilling fluid DF13 (comparative)

| Properties | 40° F. (4.4° C.) | 100° F. (37.7° C.) | 150° F. (65.5° C.) |
|---|---|---|---|
| 600 RPM reading | 197 | 122 | 101 |
| 300 RPM reading | 106 | 73 | 65 |
| 200 RPM reading | 80 | 57 | 55 |
| 100 RPM reading | 50 | 39 | 44 |
| 6 RPM reading | 17 | 19 | 28 |
| 3 RPM reading | 14 | 17 | 26 |
| 10" gel [lb/100 ft$^2$] | 18 | 21 | 31 |
| 10' gel [lb/100 ft$^2$] | 36 | 38 | 37 |
| PV [cP] | 91 | 49 | 36 |
| YP [lb/100 ft$^2$] | 15 | 24 | 29 |

TABLE 3n

Drilling fluid DF14 (comparative)

| Properties | 40° F. (4.4° C.) | 100° F. (37.7° C.) | 150° F. (65.5° C.) |
|---|---|---|---|
| 600 RPM reading | 210 | 77 | 64 |
| 300 RPM reading | 104 | 40 | 35 |
| 200 RPM reading | 73 | 30 | 27 |
| 100 RPM reading | 41 | 19 | 19 |
| 6 RPM reading | 8.4 | 6.9 | 9 |
| 3 RPM reading | 6.6 | 5.7 | 8.2 |
| 10" gel [lb/100 ft$^2$] | 8.3 | 6.8 | 8.7 |
| 10' gel [lb/100 ft$^2$] | 16.3 | 15.6 | 17.8 |
| PV [cP] | 106 | 37 | 29 |
| YP [lb/100 ft$^2$] | −2 | 3 | 6 |

TABLE 3o

Drilling fluid DF15 (comparative)

| Properties | 40° F. (4.4° C.) | 100° F. (37.7° C.) | 150° F. (65.5° C.) |
|---|---|---|---|
| 600 RPM reading | 225 | 75 | 62 |
| 300 RPM reading | 111 | 42 | 36 |
| 200 RPM reading | 83 | 32 | 29 |
| 100 RPM reading | 46 | 21 | 21 |
| 6 RPM reading | 9.1 | 7.3 | 9.7 |
| 3 RPM reading | 7.1 | 6.7 | 8.1 |
| 10" gel [lb/100 ft$^2$] | 8.9 | 7.6 | 9.3 |
| 10' gel [lb/100 ft$^2$] | 17.9 | 16.6 | 18.4 |
| PV [cP] | 114 | 33 | 26 |
| YP [lb/100 ft$^2$] | −3 | 9 | 10 |

As it is evident from the data displayed in Tables 3c to 3h, drilling fluids containing any of the inventive rheological additive DF1 to DF6 are able to produce a constant rheology across broad temperature changes (i.e. "flat rheology") in contrast to drilling fluids containing any of the comparative rheological additives DF9 to DF15. It can be seen from inventive drilling fluids DF1 to DF6 that the amine and/or hydroxyl functional (meth)acrylic copolymer rheological additives primarily function by reducing temperature dependent rheological changes of the drilling fluid, most significantly by enhancing viscosity at higher temperatures and lower rotational frequencies. For example, the addition of these rheological additives increased the 6 RPM readings from 6 to values ranging from 15-17 (Drilling fluids DF1 to DF3) at a temperature of 150° F. (65.5° C.). This minimized the mean percent change from mean values across temperature, displayed in Table 4 hereinafter, from 29% to values of 8%, 14% and 8%.

TABLE 4

Flat Rheology comparison of additives in drilling fluid examples DF1 to DF6 and comparative Examples DF7 to DF15:

| Drilling fluid | YP (Target: ≤20%) | 6 RPM (Target: ≤20%) | 10' Gel (Target: ≤20%) |
|---|---|---|---|
| DF7 | 54% | 29% | 29% |
| DF8 | 31% | 12% | 4% |
| DF1 | 18% | 8% | 7% |
| DF2 | 18% | 14% | 4% |
| DF3 | 15% | 8% | 6% |
| DF4 | 17% | 12% | 3% |
| DF5 | 17% | 9% | 3% |
| DF6 | 19% | 7% | 2% |
| DF9 | 103% | 9% | 7% |
| DF10 | 31% | 11% | 5% |
| DF11 | 31% | 16% | 8% |
| DF12 | 26% | 16% | 8% |
| DF13 | 23% | 21% | 2% |
| DF14 | 124% | 10% | 5% |
| DF15 | 104% | 11% | 4% |

Percentages given in Table 4 represent mean percent changes from mean values at temperatures of 40° F. (4.4° C.), 100° F. (37.7° C.) and 150° F. (65.5° C.).

The dampening of the change in viscosity at higher rotational frequencies across temperature also had a dramatic impact on the yield point. The addition of the inventive OH— and/or amino-functional (meth)acrylic copolymers decreased the mean percent change from mean values across temperature from 54% to values ranging from 15%-19%. A significant drop off in 10' gel, from 29% to values ranging from 2%-7% was also observed. The non-functional (meth)acrylic copolymer (DF9) had a mean percent change from mean value of 103% for YP. In addition, the two carboxyl functional (meth)acrylic copolymers (DF14 and DF15) had a mean percent change from mean value of 124% and 104% respectively for YP. The performance of these non-functional/carboxyl functional (meth)acrylic copolymers is significantly worse than the complete absence of rheological additive with and without the fatty acid component (DF7 and DF8). These findings demonstrate the significance of amino and/or hydroxyl functionality for imparting flat rheology with (meth)acrylic copolymers.

The inventive rheological additives outperformed the competitive flat rheology additives by reducing variations in 6 RPM readings and YP while maintaining a similar 10' gel strength. A minimal change in these rheological properties across temperature changes should be recognized by those of skill in the art as describing flat rheology. The most significant improvement in rheology of the (meth)acrylic copolymer rheological additives relative to the comparative examples was a reduction in YP variation across temperature. The comparative additives present in comparative drilling fluids DF10, DF11 and DF12 had a YP variation across 40° F. (4.4° C.), 100° F. (37.7° C.) and 150° F. (65.5° C.) temperature points>26%, which is well above the variation reported for the inventive (meth)acrylic copolymers. The comparative present in comparative drilling fluid DF13 had a slightly improved variation of 23%, but suffered from a significantly higher 6 RPM variation of 21%. The commercial additive THIXATROL® DW 50 present in comparative DF13 had significantly higher 6 RPM and YP than the inventive (meth)acrylic copolymers contained herein. These findings demonstrates the significance of the amino and/or hydroxyl functional (meth)acrylic copolymers for imparting flat rheology in drilling fluids.

The invention claimed is:

1. A drilling fluid in the form of a water-in-oil (W/O) emulsion comprising at least components (A) to (D), each being different from one another, namely
(A) at least one hydrocarbon as continuous phase,
(B) water or an aqueous solution of at least one organic and/or inorganic salt as discontinuous phase,
(C) at least one weighting agent, and
(D) at least one (meth)acrylic copolymer,
wherein the (meth)acrylic copolymer (D) contains at least one of structural units (D1), (D2) and (D3), which are different from one another,
structural unit (D1) comprising at least one hydroxyl group and not comprising any amino groups,
structural unit (D2) comprising at least one amino group and not comprising any hydroxyl groups, and
structural unit (D3) comprising both at least one hydroxyl group and at least one amino group,
and wherein the (meth)acrylic copolymer (D) further contains at least one structural unit (D4), which is different from any of structural units (D1), (D2) and (D3), structural unit (D4) containing the part structure (P)

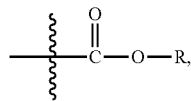

(P)

wherein
the symbol

denotes a covalent bond of part structure (P) to the backbone of the (meth)acrylic copolymer, and
R denotes a C4-C25 aliphatic residue, an aromatic C6-C25 residue or an araliphatic C7-C25 residue.

2. The drilling fluid according to claim 1, wherein the relative molar ratio of the at least one of structural units (D1), (D2) and (D3) to the at least one structural unit (D4) in the (meth)acrylic copolymer is in the range of from 1:40 to 1.5:1.

3. The drilling fluid according to claim 1, wherein the amount of structural units (D4) in the (meth)acrylic copolymer is at least 40 mole-%, based on the total amount of all structural units of the copolymer.

4. The drilling fluid according to claim 1, wherein the at least one amino group present in structural units (D2) and/or (D3) is a tertiary amino group.

5. The drilling fluid according to claim 1, wherein radical R denotes a C4-C22 aliphatic residue or a C8-C18 aliphatic residue.

6. The drilling fluid according to claim 1, wherein the (meth)acrylic copolymer as component (D) is obtainable by copolymerization of at least one of monomers (d1), (d2) and (d3), namely
(d1) 3 to 60 mole-% of at least one ethylenically unsaturated monomer having at least one hydroxyl group or at least one functional group that can be transformed into a hydroxyl group by a polymer analogous reaction after formation of the copolymer, and/or
(d2) 3 to 60 mole-% of at least one ethylenically unsaturated monomer having at least one amino group or at least one functional group that can be transformed into an amino group by a polymer analogous reaction after formation of the copolymer, and/or
(d3) 3 to 60 mole-% of at least one ethylenically unsaturated monomer having at least one amino group or at least one functional group that can be transformed into an amino group by a polymer analogous reaction after formation of the copolymer and having at least one hydroxyl group or at least one functional group that can be transformed into a hydroxyl group by a polymer analogous reaction after formation of the copolymer,
and at least one of monomers (d4), namely
(d4) 40 to 97 mole-% of at least one monomer selected from the group consisting of (meth)acrylic esters of an aliphatic C4-C25-monoalcohol, (meth)acrylic esters of an aromatic C6-C25 monoalcohol, (meth)acrylic esters of an araliphatic C7-C25-monoalcohol and mixtures thereof, as well as optionally at least one of monomers (d5), (d6) and (d7), namely
(d5) 0 to 20 mole-% of at least one monomer selected from the group consisting of (meth)acrylic esters of an aliphatic C1-C3-monoalcohol, and/or
(d6) 0 to 20 mole-% of at least one monomer having precisely one ethylenically unsaturated group, which is different from each of monomers (d1), (d2), (d3), (d4) and (d5), and/or
(d7) 0 to 5 mole-% of at least one monomer having at least two ethylenically unsaturated groups, which is different from each of monomers (d1), (d2), (d3), (d4) and (d5), wherein the sum of monomers (d1), (d2), (d3), (d4), (d5), (d6) and (d7) used for the preparation of the copolymer adds up to 100 mole-%.

7. The drilling fluid according to claim 1, wherein the (meth)acrylic copolymer as component (D) is obtainable by copolymerization of at least one of monomers (d1), (d2) and (d3), namely
   (d1) 5 to 50 mole-% of at least one monomer selected from the group consisting of (meth)acrylic esters of aliphatic C1-C6-monoalcohols, which bear at least one hydroxyl group or at least one functional group that can be transformed into a hydroxyl group by a polymer analogous reaction after formation of the copolymer, (meth)acrylic amides containing an aliphatic C1-C6-group, which bear at least one hydroxyl group or at least one functional group that can be transformed into a hydroxyl group by a polymer analogous reaction after formation of the copolymer, and mixtures thereof, and/or
   (d2) 5 to 50 mole-% of at least one monomer selected from the group consisting of (meth)acrylic esters of an aliphatic C1-C6-monoalcohols, which bear at least one amino group or at least one functional group that can be transformed into an amino group by a polymer analogous reaction after formation of the copolymer, (meth)acrylic amides containing an aliphatic C1-C6-group, which bear at least one amino group or at least one functional group that can be transformed into an amino group by a polymer analogous reaction after formation of the copolymer, and mixtures thereof, and/or
   (d3) 5 to 50 mole-% of at least one monomer selected from the group consisting of (meth)acrylic esters of aliphatic C1-C6-monoalcohols, which bear at least one amino group or at least one functional group that can be transformed into an amino group by a polymer analogous reaction after formation of the copolymer and at least one hydroxyl group or at least one functional group that can be transformed into a hydroxyl group by a polymer analogous reaction after formation of the copolymer, (meth)acrylic amides containing an aliphatic C1-C6-group, which bear at least one amino group or at least one functional group that can be transformed into an amino group by a polymer analogous reaction after formation of the copolymer and at least one hydroxyl group or at least one functional group that can be transformed into a hydroxyl group by a polymer analogous reaction after formation of the copolymer, and mixtures thereof,
and at least one of monomers (d4), namely
   (d4) 50 to 95 mole-% of at least one monomer selected from the group consisting of (meth)acrylic esters of an aliphatic C4-C25-monoalcohol, (meth)acrylic esters of an araliphatic C7-C25-monoalcohol and mixtures thereof,
as well as optionally at least one of monomers (d5), (d6) and (d7), namely
   (d5) 0 to 15 mole-% of at least one monomer selected from the group consisting of (meth)acrylic esters of an aliphatic C1-C3-monoalcohol, and/or
   (d6) 0 to 15 mole-% of at least one monomer having precisely one ethylenically unsaturated group, which is different from each of monomers (d1), (d2), (d3), (d4) and (d5), and/or
   (d7) 0 to 4 mole-% of at least one monomer having at least two ethylenically unsaturated groups, which is different from each of monomers (d1), (d2), (d3), (d4) and (d5), wherein the sum of monomers (d1), (d2), (d3), (d4), (d5), (d6) and (d7) used for the preparation of the copolymer adds up to 100 mole-%.

8. The drilling fluid according to claim 1, wherein the drilling fluid comprises
   (A) component (A) in an amount of 10 to 60 wt.-%,
   (B) component (B) in an amount of 2.5 to 40 wt.-%,
   (C) component (C) in an amount of 10 to 90 wt.-% and
   (D) component (D) in amount of 0.005 to 8 wt.-%,
   in each case based on the total weight of the drilling fluid, wherein the total amount of all components present in the drilling fluid adds up to 100 wt.-%.

9. The drilling fluid according to claim 1, further comprises further comprising at least one organic acid as a component (E).

10. The drilling fluid according to claim 9, wherein the at least one organic acid used as component (E) is at least one oligomer of at least one C10-C28-fatty acid and in that the relative weight ratio of the (meth)acrylic copolymer to the at least one oligomer of at least one C10-C28-fatty acid is in the range of from 1:9 to 9:1.

11. The drilling fluid according to claim 9, wherein it comprises
   (E) component (E) in amount of 0.01 to 5 wt.-%,
   based on the total weight of the drilling fluid, wherein the total amount of all components present in the drilling fluid adds up to 100 wt.-%.

12. The drilling fluid according to claim 1, further comprising one or more of a thixotropic agent, emulsifier, alkalinity imparting component, proppant, fluid loss additive, thinner, viscosifier, and combinations thereof.

13. A method of producing oil and/or natural gas or of preparing the production of oil and/or natural gas, comprising the step of using a drilling fluid according to claim 1 for generating and/or operating a drill hole.

14. A method of making a drilling fluid, the method comprising combining at least one (meth)acrylic copolymer as rheological additive with a drilling fluid, wherein the drilling fluid is a water-in-oil (W/O) emulsion and wherein the (meth)acrylic copolymer contains at least one of structural units (D1), (D2) and (D3), which are different from one another,
   structural unit (D1) comprising at least one hydroxyl group and not comprising any amino groups,
   structural unit (D2) comprising at least one amino group and not comprising any hydroxyl groups, and
   structural unit (D3) comprising both at least one hydroxyl group and at least one amino group,
   and wherein the (meth)acrylic copolymer further contains at least one structural unit (D4), which is different from any of structural units (D1), (D2) and (D3),
   structural unit (D4) containing the part structure (P)

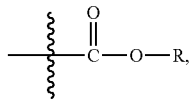

(P)

wherein
the symbol

denotes a covalent bond of part structure (P) to the backbone of the (meth)acrylic copolymer, and R denotes a C4-C25 aliphatic residue, an aromatic C6-C25 residue or an araliphatic C7-C25 residue.

15. The method according to claim 14, wherein the at least one (meth)acrylic copolymer is used as rheological additive in combination with at least one organic acid.

* * * * *